United States Patent
Robbins et al.

(10) Patent No.: US 6,807,676 B1
(45) Date of Patent: Oct. 19, 2004

(54) METHODS OF FORMATTING DATA TO MAXIMIZE THE READABILITY AND THE AMOUNT OF SONG IDENTIFICATION INFORMATION DISPLAYED ON A LIMITED NUMBER OF LINES

(75) Inventors: Clyde Robbins, Maple Glen, PA (US); John F. Maraska, Abington, PA (US); John Kamieniecki, Lafayette Hill, PA (US); Douglas W. Palmer, W. Norriton, PA (US); Tony Nasuti, Norristown, PA (US); Robert C. Stein, Coopersburg, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/119,503

(22) Filed: Jul. 20, 1998

Related U.S. Application Data

(63) Continuation of application No. 08/620,019, filed on Mar. 21, 1996, now Pat. No. 5,784,095, which is a continuation-in-part of application No. 08/502,517, filed on Jul. 14, 1995, now Pat. No. 5,796,423.
(60) Provisional application No. 60/001,395, filed on Jul. 24, 1995.

(51) Int. Cl.[7] .......................... G06F 3/00; G06F 13/00
(52) U.S. Cl. .......................... 725/39; 725/37; 725/118; 725/126; 707/518; 707/517; 707/534; 707/525; 715/518; 715/505; 715/508; 345/801; 348/470; 348/473; 348/474; 348/461; 348/462; 348/467
(58) Field of Search .......................... 725/37, 39, 118, 725/126; 707/517, 518, 534, 525; 715/518, 505, 508; 345/801; 348/470, 473, 474, 461, 462, 467

(56) References Cited

U.S. PATENT DOCUMENTS

| | | | | |
|---|---|---|---|---|
| 3,671,956 A | * | 6/1972 | Kegelman et al. | ............. 345/14 |
| 4,503,515 A | * | 3/1985 | Cuan et al. | .................. 715/537 |
| 4,569,081 A | * | 2/1986 | Mintzer et al. | ............. 382/299 |

(List continued on next page.)

FOREIGN PATENT DOCUMENTS

| | | | | |
|---|---|---|---|---|
| EP | 0 673 165 A1 6 | | 3/1995 | |
| JP | 404147190 A | * | 5/1992 | ............ G09G/5/36 |
| JP | 09134361 | * | 5/1997 | ............ G06F/17/28 |
| WO | 95/32587 6 | | 11/1995 | |

OTHER PUBLICATIONS

Kleine, G., "ASTRA DIGITAL RADIO (ADR)–1", Elektor Electronics, May 1995, pp. 44–47.

*Primary Examiner*—Chris Grant
*Assistant Examiner*—Jason Salce
(74) *Attorney, Agent, or Firm*—Volpe and Koenig, P.C.

(57) ABSTRACT

A method of formatting data to maximize the readability of song identification (ID) information displayed on a monitor screen and a method of formatting data to maximize the amount of song ID information displayed on a limited number of lines on the monitor screen. The monitor screen is used to view in-band audio broadcast channel song ID information and out-of-band audio broadcast channel song ID information. The in-band ID information is associated with a song that is currently being played on a selected one of a plurality of channels. The out-of-band ID information is associated with all of the plurality of channels. To maximize readability, in-band ID information is abbreviated if the amount of information exceeds a maximum number of lines determined for the in-band ID information. To maximize the amount of in-band ID information, wraparound and abbreviation techniques are performed.

21 Claims, 23 Drawing Sheets

U.S. PATENT DOCUMENTS

| | | | | |
|---|---|---|---|---|
| 4,608,664 A | * | 8/1986 | Bartlett et al. | 358/1.2 |
| 4,792,849 A | | 12/1988 | McCalley et al. | 358/86 |
| 4,829,372 A | | 5/1989 | McCalley et al. | 358/86 |
| 4,862,268 A | | 8/1989 | Campbell et al. | 358/141 |
| 4,896,148 A | * | 1/1990 | Kurita | 345/670 |
| 4,924,303 A | | 5/1990 | Brandon et al. | 358/86 |
| 4,963,995 A | | 10/1990 | Lang | 358/335 |
| 5,045,940 A | | 9/1991 | Peters et al. | 358/143 |
| 5,111,287 A | | 5/1992 | Citta et al. | 358/83 |
| 5,132,992 A | | 7/1992 | Yurt et al. | 375/122 |
| 5,144,693 A | * | 9/1992 | Morgan | 345/792 |
| 5,202,761 A | | 4/1993 | Cooper | 358/149 |
| 5,220,420 A | | 6/1993 | Hoarty et al. | 358/86 |
| 5,237,610 A | | 8/1993 | Gammie et al. | 380/10 |
| 5,239,540 A | | 8/1993 | Rovira et al. | 370/77 |
| 5,252,775 A | | 10/1993 | Urano | 84/645 |
| 5,253,275 A | | 10/1993 | Yurt et al. | 375/122 |
| 5,257,396 A | | 10/1993 | Auld, Jr. et al. | 455/6.2 |
| 5,282,028 A | | 1/1994 | Johnson et al. | 358/86 |
| 5,355,162 A | | 10/1994 | Yazolino et al. | 348/11 |
| 5,414,455 A | | 5/1995 | Hooper et al. | 348/7 |
| 5,418,559 A | | 5/1995 | Blahut | 348/10 |
| 5,485,221 A | * | 1/1996 | Banker et al. | 348/563 |
| 5,497,187 A | | 3/1996 | Banker et al. | 348/478 |
| 5,544,288 A | * | 8/1996 | Morgan et al. | 345/801 |
| 5,559,548 A | * | 9/1996 | Davis et al. | 725/40 |
| 5,585,866 A | * | 12/1996 | Miller et al. | 725/43 |
| 5,594,509 A | | 1/1997 | Florin et al. | 348/906 |
| 5,619,425 A | * | 4/1997 | Funahashi et al. | 709/219 |
| 5,671,378 A | * | 9/1997 | Acker et al. | 345/801 |
| 5,805,747 A | * | 9/1998 | Bradford | 382/310 |
| RE36,653 E | * | 4/2000 | Heckel et al. | 345/700 |
| 6,068,809 A | * | 5/2000 | Chen et al. | 264/328.1 |
| 6,112,216 A | * | 8/2000 | Pratley et al. | 715/509 |
| 6,157,379 A | * | 12/2000 | Singh | 345/866 |
| 6,230,322 B1 | * | 5/2001 | Saib et al. | 725/40 |

\* cited by examiner

FIG. 3

Out-of-band ↓

| GI | Sunday, September 14 ||
|---|---|---|
| | 11:30am | 12:00pm |
| ABC 3 | Investigation ||
| HBO 4 | Honey, I Blew up The Kid ||
| ESPN 8 | Lakers Basketball | The Wizard |
| NBC 9 | Unsolved Mysteries ||
| SHOW 14 | New Adventures of Superman | Cops |
| FOX 15 | Candid Camera | Looney Tunes |
| For Help press * | To move △◁▷▽ | 11:45 am Sat, Sep,14 |

40

FIG. 4
Unit format

| Header | Group 1 | Group 2 | Group 3 | Group 4 | Group 5 | Group 6 | Group 7 | Group 8 | Group 9 | Group 10 |

FIG. 5
Header format

| Run-in-stream | Framing Stream | Tag Stream | Song ID Stream |

FIG. 6
Group format (groups 1-10)

| Audio data stream | Control stream | Broadcast stream |

FIG. 7
Audio data stream format

Normal stereo group format (1 stereo channel)

FIG. 8
Audio data stream format

Low sampling rate stereo group format (2 low sampling stereo channels)

FIG. 9
Audio data stream format

Voice Monaural stereo group format (4 mono channels)

In - band

42

| GI | LISTEN TO MUSIC | MUSIC CHOICE |
|---|---|---|
| Listen to Favorite Channels | | |
| Listen to Channels by Theme | | |
| Find a Channel | | |
| Control Channel Listening | | |
| | | |
| For Help press * | To move press △▽ | Page 1 of 1 |

| (GI) | CONTROL CHANNEL LISTENING | MUSIC CHOICE |
|---|---|---|
| Set Favorite Channels | | |
| Set Parental Control | | |
| Control Audio Configuration | | |
| | | |
| For Help press * | To move press △▽ | Page 1 of 1 |

FIG. 13

| (GI) | CONTROL AUDIO CONFIGURATION | MUSIC CHOICE |
|---|---|---|
| Turn Volume Equalizer On | | |
| Lock the Converter | | |
| Set Best Stereo Volume Level | | |
| Set Sleep Timer | | |
| Set Alarm Timer | | |
| Enable Screen Blanking | | |
| For Help press * | To move press △▽ | Page 1 of 2 |

FIG. 14

| GI | CONTROL AUDIO CONFIGURATION | MUSIC CHOICE |
|---|---|---|
| Set VCR Timer | | |
| View Scheduled Events | | |
| | | |
| For Help press* | To move press △▽ | Page 2 of 2 |

FIG. 15

| GI | HELP | MUSIC CHOICE |
|---|---|---|
| | Moving Around a Screen | |
| ◁O▷ (arrows) | Press arrow keys to highlight an item | |
| ◁O▷ (arrows) | Press SELECT to choose an item | |
| +PAGE- | Press PAGE +/- for more information | |
| For next screen: PAGE+ | To return press: LAST | Page 1 of 3 |

FIG. 16

| GI | HELP | MUSIC CHOICE |
|---|---|---|
| | Navigating Through the Music Choice System | |

| EXIT | Press EXIT to return to Song ID |
|---|---|
| LAST | Press Last to go to previous screen |
| MENU | Press MENU to go to "Listen to Music" screen |

| For next screen: PAGE+ | To return press: LAST | Page 2 of 3 |

FIG. 17

| GI | HELP | MUSIC CHOICE |
|---|---|---|
| | Navigating Through the Music Choice System | |

| MUSIC | Press MUSIC to switch between TV and MUSIC Choice |
|---|---|

| Previous screen: PAGE- | To return press: LAST | Page 3 of 3 |

FIG. 18

| GI | SET FAVORITE CHANNELS | MUSIC CHOICE |
|---|---|---|
| FAV | A 19 Soft Rock | |
| | A 20 Love Songs | |
| | A 21 Progressive Country | |
| | A 22 Contemporary Country | |
| FAV | A 23 Country Gold | |
| | A 24 Big Band /Nostalgia | |
| | A 25 Easy Listening | |
| | A 26 Classical Interludes | |
| FAV | A 27 Classics In Concert | |
| | A 28 Contemporary Christian | |
| | A 29 Gospel | |
| | A 30 Exitos | |
| To set favorite ch press: SELECT | | To clear all press: 0 |

FIG. 19

| GI | SET PARENTAL CONTROL | MUSIC CHOICE |
|---|---|---|
| LOCK | A 10 Contemporary Jazz | |
| | A 11 New Age | |
| LOCK | A 12 Eclectic Rock | |
| | A 13 Modern Rock | |
| | A 14 Classic Rock | |
| | A 15 Rock Plus | |
| | A 16 Underground Rock | |
| LOCK | A 17 Metal | |
| | A 18 Solid Gold Oldies | |
| | A 19 Soft Rock | |
| | A 20 Love Songs | |
| | A 21 Progressive Country | |
| To set control press: SELECT | | To clear all press: 0 |

FIG. 20

| GI | LISTEN TO FAVORITE CHANNELS | MUSIC CHOICE |
|---|---|---|
| A 1 | Hit List | |
| A 7 | Blues | |
| A 10 | Contemporary Jazz | |
| A 11 | New Age | |
| A 13 | Modern Rock | |
| A 14 | Classic Rock | |
| A 23 | Country Gold | |
| A 26 | Classical Interludes | |
| A 29 | Gospel | |

A 13    Modern Rock

"What's the Frequency, Kenneth?"
By: R.E.M.

| For Help press * | To move press △▽ | To tune press SELECT |
|---|---|---|

FIG. 21

| DIGITAL AUDIO | PREVIOUSLY HEARD A 14 | MUSIC CHOICE |
|---|---|---|

Classic Rock

"Somebody to Love"

By: Queen

CD: Queen's Greatest Hits

On: EMI

46

Notice: Jazz Plus, Singers &
         Standards 4 pmET

47

| For Help press * | | Playlist ◁ 2 ▷ |
|---|---|---|

FIG. 22

| GI | FIND A CHANNEL | MUSIC CHOICE |
|---|---|---|
| A 1 | Hit List | |
| A 2 | Dance | |
| A 3 | Hip Hop | |
| A 4 | Urban Beat | |
| A 5 | Body & Soul | |
| A 6 | Reggae | |
| A 7 | Blues | |
| A 8 | Jazz | |
| A 9 | Jazz Plus | |
| A 13 | Modern Rock "What's the Frequency, Kenneth?" By: R.E.M. | |
| For Help press * | To move press △▽ | To tune press SELECT |

FIG. 23

| GI | ROCK | MUSIC CHOICE |
|---|---|---|
| A 12 | Eclectic Rock | |
| A 13 | Modern Rock | |
| A 14 | Classic Rock | |
| A 15 | Rock Plus | |
| A 16 | Underground Rock | |
| A 17 | Metal | |
| | | |
| A 13 | Modern Rock "What's the Frequency, Kenneth?" By: R.E.M. | |
| For Help press* | To move press △▽ | To tune press SELECT |

FIG. 24

| GI | FIND A CHANNEL | MUSIC CHOICE |
|---|---|---|
| A 1 | Hit List | |
| A 2 | Dance | |
| A 3 | Hip Hop | |
| A 4 | Urban Beat | |
| A 5 | Body & Soul | |
| A 6 | Classic Rock | |
| A 7 | Modern Rock | |
| A 8 | Jazz | |
| A 9 | Jazz Plus | |
| A 7 | Modern Rock | |

"What's the Frequency, Kenneth?"
By: R.E.M.

| For Help press * | To move press △▽ | To tune press SELECT |
|---|---|---|

FIG. 25

| DIGITAL AUDIO | NOW PLAYING A 13 | MUSIC CHOICE |
|---|---|---|
| | Modern Rock | |

"What's the Frequency, Kenneth?"

By: R.E.M.

CD: Monster

On: Warner Bros.

Notice: Jazz Plus, Singers &
Standards 4 pmET

| For Help press * | | Playlist ◁ 1 ▷ |
|---|---|---|

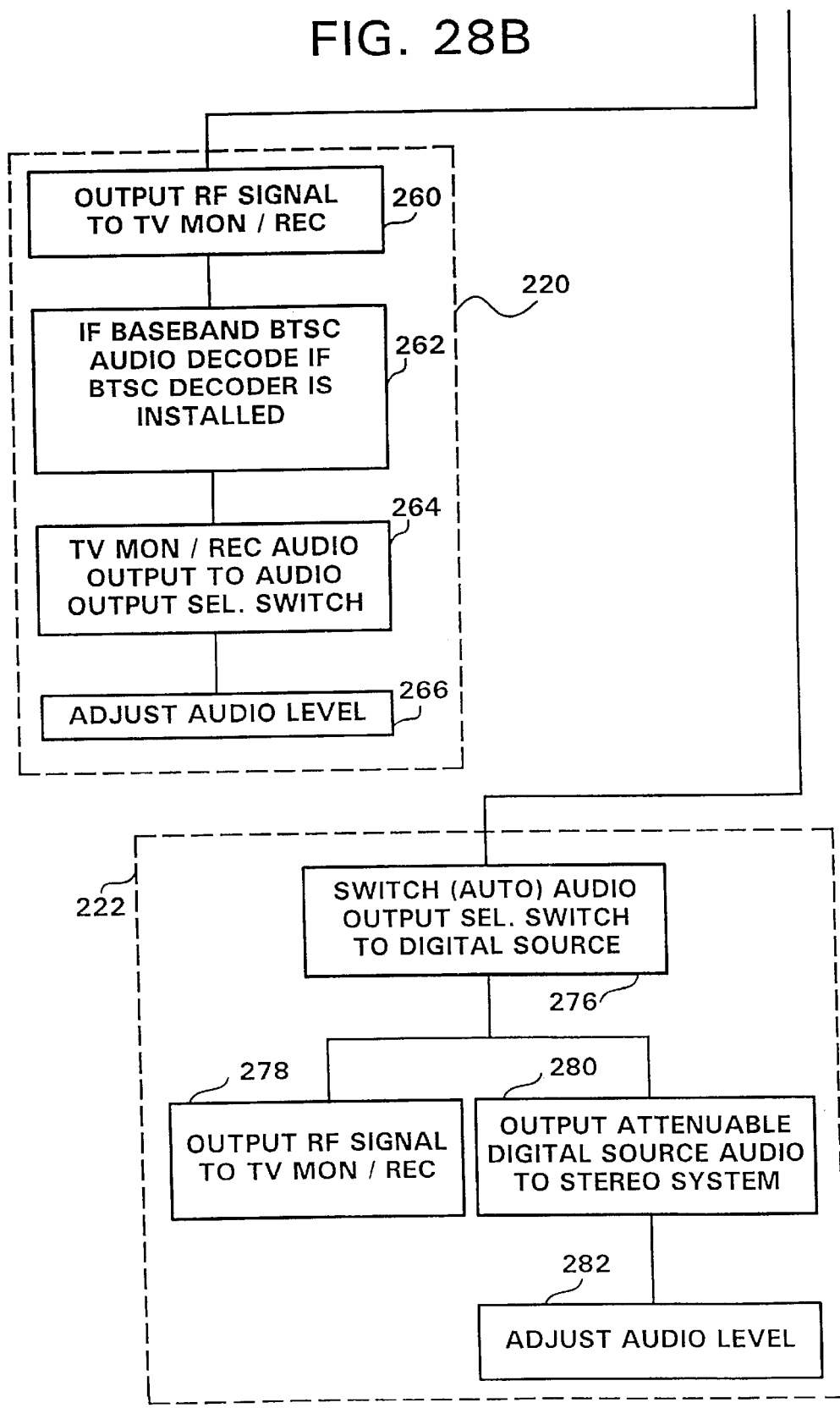

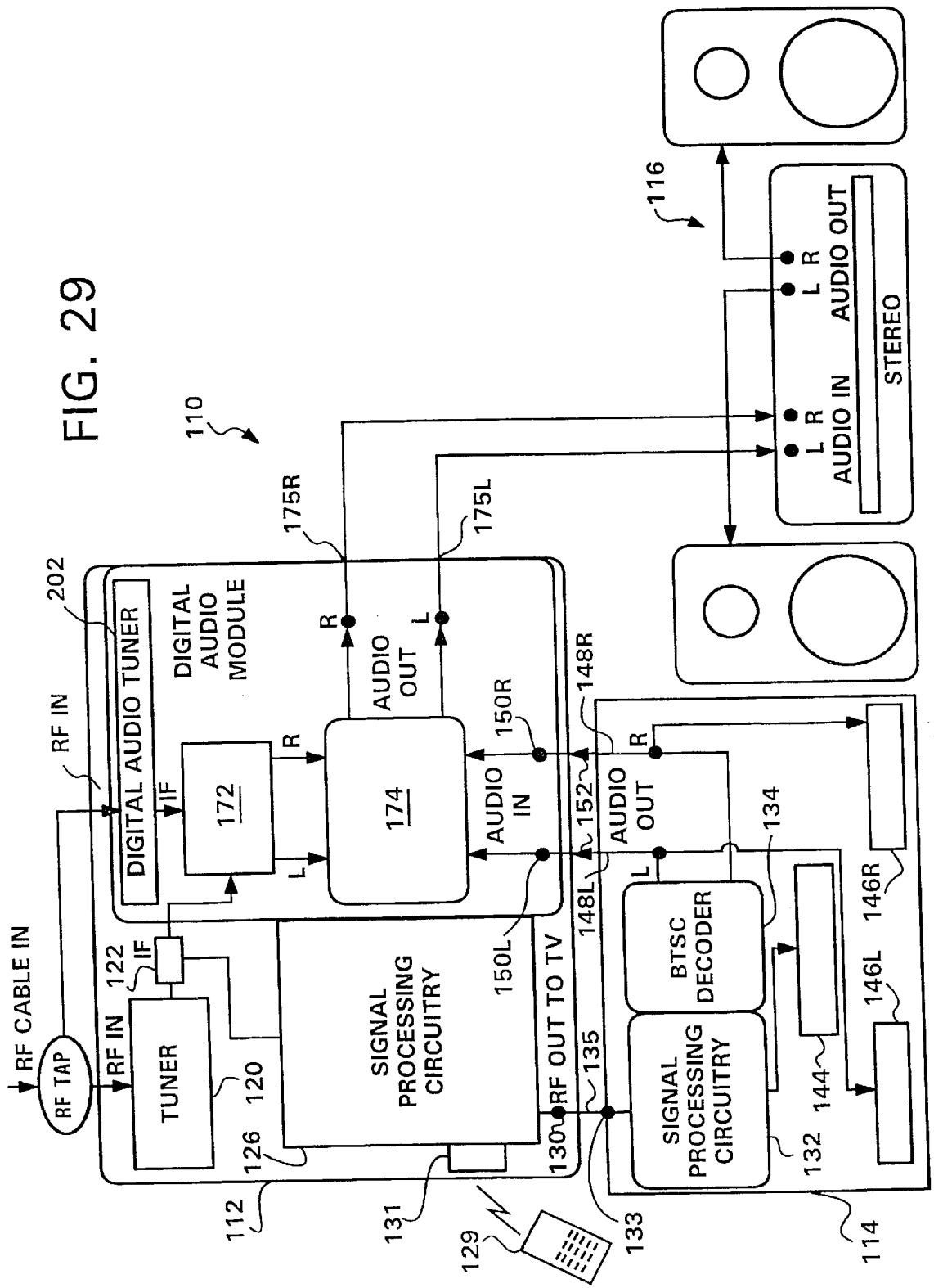

METHODS OF FORMATTING DATA TO MAXIMIZE THE READABILITY AND THE AMOUNT OF SONG IDENTIFICATION INFORMATION DISPLAYED ON A LIMITED NUMBER OF LINES

This application is a continuation of application Ser. No. 08/620,019, filed on Mar. 21, 1996 which issued on Jul. 21, 1998 as U.S. Pat. No. 5,784,095; which is a continuation-in-part of U.S. application Ser. No. 08/502,517, filed Jul. 14, 1995, now U.S. Pat. No. 5,796,423 and also claims priority from U.S. Provisional Application No. 60/001,395, filed Jul. 24, 1995.

BACKGROUND OF THE INVENTION

1. Field of the Invention

This invention relates generally to cable television communication systems. More particularly, the invention relates to a cable television digital audio system which utilizes a television as the subscriber interface to permit tuning of audio and video channels by integrating in-band and out-of-band information.

2. Description of Related Art

Cable television (CATV) operators have recently begun to offer their subscribers an increasing array of services from which to choose. Among these services are digital audio music channels which provide CD-quality music in addition to video channels on the CATV system. The CATV operator may also provide information related to the current audio selection, including the title, composer, artist and record label. In these systems, a subscriber may select from a plurality of audio channels for listening to commercial-free music, and view information corresponding to the selection. commercial-free music, and view information corresponding to the selection.

An example of a typical prior art system is disclosed in U.S. Pat. No. 5,282,028 (Johnson et al.). This system includes a hand-held remote control unit with an alphanumeric information display which controls a digital music tuner. The digital music tuner is separately provided in addition to a CATV settop terminal. The information related to the current musical selection is displayed on a liquid crystal display LCD located on the remote control unit. Alternatively, the information may be displayed on an LCD located on the front panel of the settop terminal or to a cathode ray tube.

Since the Johnson system requires a separate graphical interface for displaying information to a subscriber, the cost of the system is increased. Additionally, systems similar to Johnson's system only provide information related to the current selection to which the channel is tuned.

There exists a need for an audio/video system which permits a CATV subscriber to easily identify and select from a variety of music channels while listening to a current music selection.

SUMMARY OF THE INVENTION

An improved settop terminal is provided which processes both analog CATV and digital audio channels. The settop terminal of the present invention utilizes a subscriber's television as the preferred graphical interface to simultaneously provide channel in-band and out-of-band program information to a subscriber. A subscriber may tune, view and select from among a plurality of digital audio channels and analog video channels. In-band and out-of-band information is integrated into a multi-page program guide displayed on a subscriber's television. This integration permits subscribers to visually scan and view information about currently playing selections available on other channels without having to switch to them. While listening to a music selection, the subscriber may navigate through the program guide. Program information such as the title of a song, artist and record label are also displayed.

Accordingly, it is an object of the invention to provide a system for integrating in-band and out-of-band program information using a program guide displayed by a television as a graphical interface with the subscriber.

Other objects and advantages will become apparent to those skilled in the art after reading the detailed description of the preferred embodiment.

BRIEF DESCRIPTION OF THE DRAWINGS

FIG. 3 is a menu page depicting a typical CDC generated programming guide;

FIG. 4 is a block diagram of a digital transmission architecture used by the present invention;

FIG. 5 is an expanded block diagram of the header format;

FIG. 6 is an expanded block diagram of the audio group format;

FIG. 7 is an expanded block diagram of the audio data stream in the normal resolution format;

FIG. 8 is an expanded block diagram of the audio data stream in the low resolution format;

FIG. 9 is an expanded block diagram view of the audio data stream in the low resolution voice format;

FIG. 12 is the Control Channel Listening screen menu of the present invention;

FIG. 13 is page one of the Control Audio Configuration menu of the present invention;

FIG. 14 is page two of the Control Audio Configuration menu of the present invention;

FIG. 15 is page one of the Help screen menu of the present invention;

FIG. 16 is page two of the Help screen menu of the present invention;

FIG. 17 is page three of the Help screen menu of the present invention;

FIG. 18 is an example Set Favorite Channels screen menu of the present invention;

FIG. 19 is the Set Parental Control page screen of the present invention;

FIG. 20 is an example Listen To Favorite Channels screen of the present invention;

FIG. 21 is the Previously Heard screen of the present invention;

FIG. 22 is the Find A Channel screen menu of the present invention;

FIG. 23 is the sub-menu screen under the category Rock;

FIG. 24 is the Find A Channel screen menu of the present invention integrating both in-band and out-of-band channel information;

FIG. 25 is the Now Playing screen of the present invention;

FIG. 29 is a block diagram of an alternative embodiment;

DETAILED DESCRIPTION OF THE PREFERRED EMBODIMENT

Figure 1:
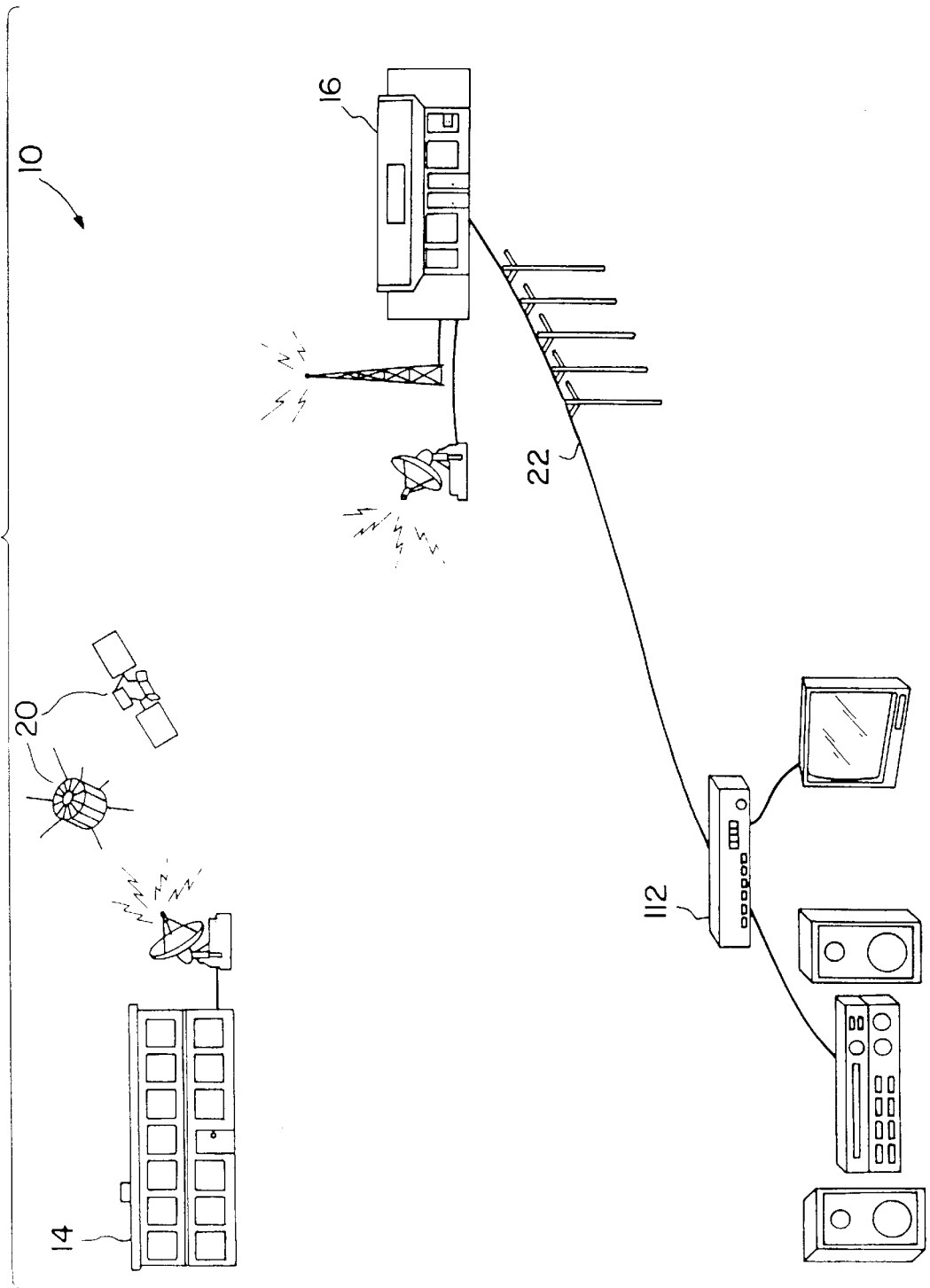
FIG. 1 is a simplified view of a CATV transmission infrastructure.

The preferred embodiment is described with reference to the drawing figures where like numerals represent like elements throughout.

A CATV communication network 10 embodying the present invention is shown in FIG. 1. The communication network 10 generally comprises one or more uplinks 14 which communicate with a plurality of headends 16, each of which in turn, communicates with a plurality of settop terminals 112. The settop terminal 112 receives the transmissions from the headend 16 through the CATV network 22. The network 22 may comprise a standard coaxial network, a hybrid fiber-coax network or a "wireless cable" network comprising microwave antennas and receivers. The settop terminals 112 are the user interface between a subscriber, the subscriber's television (which may include a stereo system) and the communication network 10.

The uplink 14 is located remotely from the headends 16 and communicates with the headends 16 via a satellite link 20. The uplink 14 generally originates all in-band video and audio programming for specific channels including live or archival broadcasts or interactive service content, (for example, movies, electronic encyclopedias, electronic catalogs, downloadable applications, movies, etc.) The information on a given channel may comprise analog video and audio, digital audio, digital data, or any combination thereof. The in-band programming information is transmitted to the uplink 14 from a plurality of separate originating sources and combined at the uplink 14 before being forwarded to the headends 16. Alternatively, a plurality of uplinks 14 may independently provide the in-band programming information to each headend 16 which will receive and coordinate the transmissions from the uplinks 14. In the preferred embodiment of the present invention, the uplink 14 originates in-band channels having analog video and associated audio programming and in-band channels having digital audio programming. Digital audio data and song identification information is also multiplexed with the audio programming information to form a broadcast stream. The broadcast stream is then encrypted and transmitted via satellite 20 to the headends 16. In-band data comprises data that is received when tuning to a specific channel and is received in conjunction with the audio/video program signals.

Figure 2:
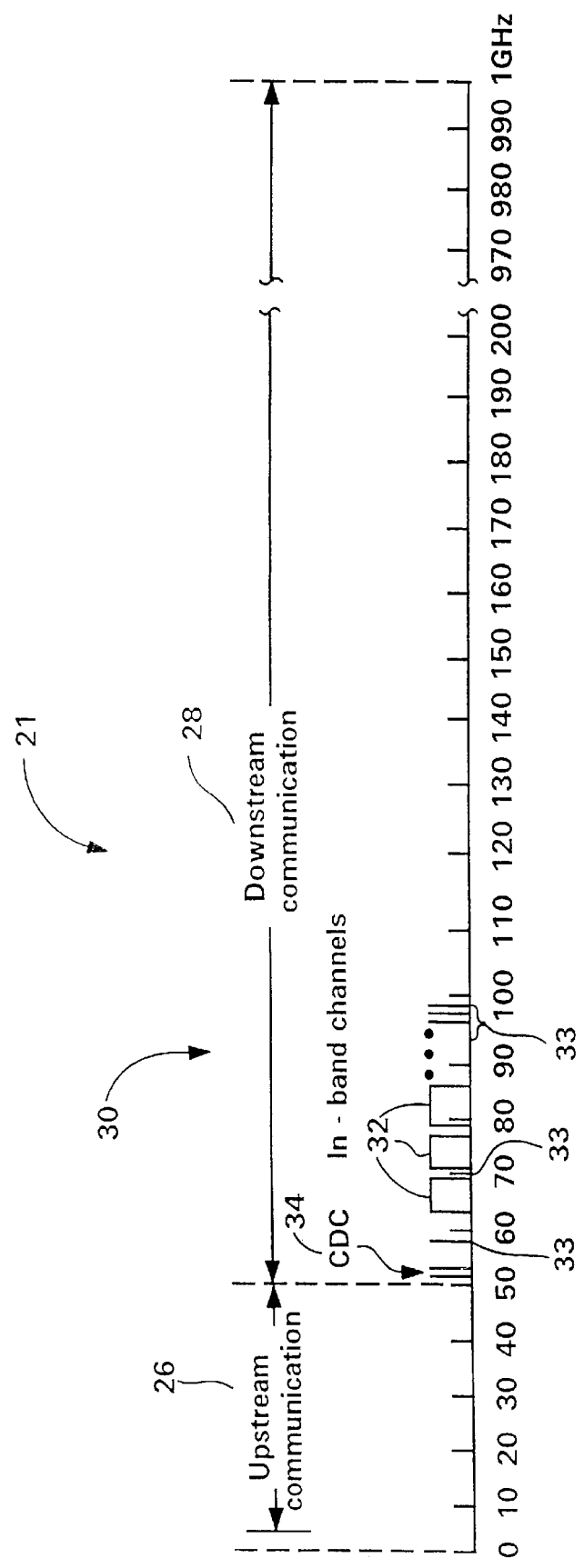
FIG. 2 is a plot of the upstream and downstream transmission frequencies.

Each headend 16 receives and decrypts the broadcast stream from the satellite 20. The bandwidth of the transmission infrastructure typically extends up to 1 GHz. In order to provide a bi-directional communication flow over the cable transmission network 22 between the headend 16 and the settop terminals 112, the transmission frequency spectrum 21 is divided into two paths as shown in FIG. 2. A downstream signal path originating at the headend 16 typically employs a downstream bandwidth 28 of frequencies above 50 MHz. An upstream path originating at the settop terminals 112 comprises an upstream bandwidth 26 of frequencies from 5 to 50 MHz. The downstream bandwidth 28 is further divided into 6 MHz broadcast channels 32 which are primarily used to transmit analog video broadcasts and their associated analog audio programs. Digital audio channels 33 are also provided to transmit digital audio information along with digital data. The digital audio channels 33 are typically 350 kHz wide and are separated by at least 600 kHz. Accordingly, digital audio channels 33 can be placed into unused bandwidth locations that are too narrow for broadcast channels 32. An apparatus and method for transmitting digital audio information is described in U.S. Pat. Nos. 5,038,402 and 5,293,633 (Robbins, et.al.), which are herein incorporated by reference as if fully set forth.

In the present invention, the portion of a 6 MHz channel that is allocated for the analog audio communication may be replaced by a corresponding digital audio program, digital data, or both. In this manner, transmissions of analog and digital communications may be frequency division multiplexed (FDM) over separate channels, or the same channel, and transported over the same network 22.

The headend 16 is the origination source or the retransmission point of all out-of-band information sent to the settop terminals 112, for example video programming guides, subscriber billing information and settop terminal control data. Since the out-of-band information 46 originates with the CATV operator, the information displayed to the subscriber such as a programming guide, is customizable by the CATV operator. Accordingly, channel themes and channel names may be rearranged, reformatted into different themes or displayed in a different language depending upon the subscriber population.

Out-of-band control and program data is forwarded to the settop terminals 112 over a specific channel known as the control data channel 34 (CDC). After the headend 16 receives the video with audio and/or digital audio programming from the uplink 14, the programming is selectively placed on 6 MHz channels as designated by the CATV operator and transmitted to settop terminals 112 over the CATV transmission network 22. In addition to forwarding programming received from the uplink 14, the headend 16 may also locally originate analog in-band audio or video channels.

The settop terminal 112 receives in-band information over the broadcast channels 32 and out-of-band information over the CDC 34. The settop terminal 112 receives the broadcast transmissions, decrypts the program, if encrypted at the headend 16, and processes the information for receipt by the subscriber. The settop terminal 112 also demodulates and demultiplexes the digital data stream, converts a portion of the digital stream to analog if the stream contains digital audio and performs other data manipulation as necessary.

In operation, a subscriber tunes the settop terminal 112 to a desired broadcast channels 32 in order to watch and/or listen to a particular program. The settop terminal 112 includes an RF tuner for this function. The program content information received on the broadcast channels 32 is in-band information. As is well known by those skilled in the art, frequency-agile broadband RF tuners typically include a separate FM "tap", or receiver, which is for receiving the narrowband CDC 34. Most settop terminals 112 are pre-set to a specific CDC 34 by the manufacturer.

The CDC 34 is used to control the settop terminal 112 through commands that initialize and configure the settop terminal 112. The settop terminal 112 incorporates a microprocessor executing a program loaded into an EEPROM (as firmware) for the various levels of services. The CDC 34 can be used to download new releases of settop terminal 112 firmware from the headend 16 when system 10 requirements change or new features are desired. The CDC 34 will service the settop terminal 112 and all of its options. In the preferred embodiment, the control data is sent at a rate of 13,980 bits per second.

The settop terminal 112 stores and generates displays of in-band song information pertaining to the current song, as well as previously heard songs. The information may include the song title, the artist, the record label, etc. Graphical images that are associated with a particular song such as an album covers, stills, video, etc., can be stored and displayed along with a song. The settop terminal 112 is designed to store and retrieve a number of song information records. The information that accompanies the audio program is derived from a special channel in-band data stream that originates at the uplink 14.

A subscriber may also view out-of-band information in the form of a video program guide 40, as shown in FIG. 3, or a billing menu by tuning to the channel for the program guide designated by the CATV operator. This information is typically downloaded by the CATV operator at the headend 16 into the memory within settop terminal 112 via the CDC 34. Since the CDC 34 is a narrowband channel typically 300 kHz wide, downloading a typical seven-day video program guide takes approximately 40 minutes.

The format of the digital data stream is composed of an information packet that is transmitted every 750 μs. As shown in FIG. 4, the unit consists of a header and ten data groups. Referring to FIG. 5, the header consists of a run-in stream, an in-band framing stream, a tag stream, and a song identification stream composed. The run-in data stream is used for synchronizing the DCR module with the digital data stream. The in-band framing stream is also used for synchronization. The tag data stream transmits information pertaining to the current channel to which the terminal is tuned, such as encryption data and authorization codes. The tag stream information is used for authorization status and contains data that is used to decrypt the audio data stream described below. In the preferred embodiment, tag stream information is sent at a rate of 1,330 bits per second.

The in-band song identification stream is used to deliver information about the current song being played such as channel name, artist, title, record company, etc. In the preferred embodiment, song identification is also sent at a rate 1,330 bits per second.

The format of each data group is shown in FIG. 6, and consists of an audio data stream, a control stream, and a broadcast stream. The in-band audio stream carries the digital audio information eventually heard on the subscriber's stereo and is a Dolby® encoded, encrypted data stream that may be in one of three different formats depending on the audio mode being sent. The in-band control stream contains the same information present on the CDC. The settop terminal can be configured to obtain the CDC information from either source.

As shown in FIGS. 7, 8 and 9, the three modes are: 1) normal (high) resolution stereo comprising one stereo pair, 2) low resolution stereo comprising two stereo pairs, and 3) monaural voice comprising four monaural channels. The three audio modes allow the option of using one channel to broadcast either 1, 2, or 4 audio programs, based on the audio (fidelity) requirements of the programming. Normal stereo provides highest audio quality using the entire allocated bandwidth the cable channel can carry. Since the bandwidth of human speech is much less than music, monaural voice mode provides the lowest audio quality but takes up one quarter the capacity of the audio channel thereby quadrupling the available channel. It will be appreciated by those skilled in the art that the format of the data stream may be modified without departing from the scope and spirit of the invention.

Figures 10, 11:
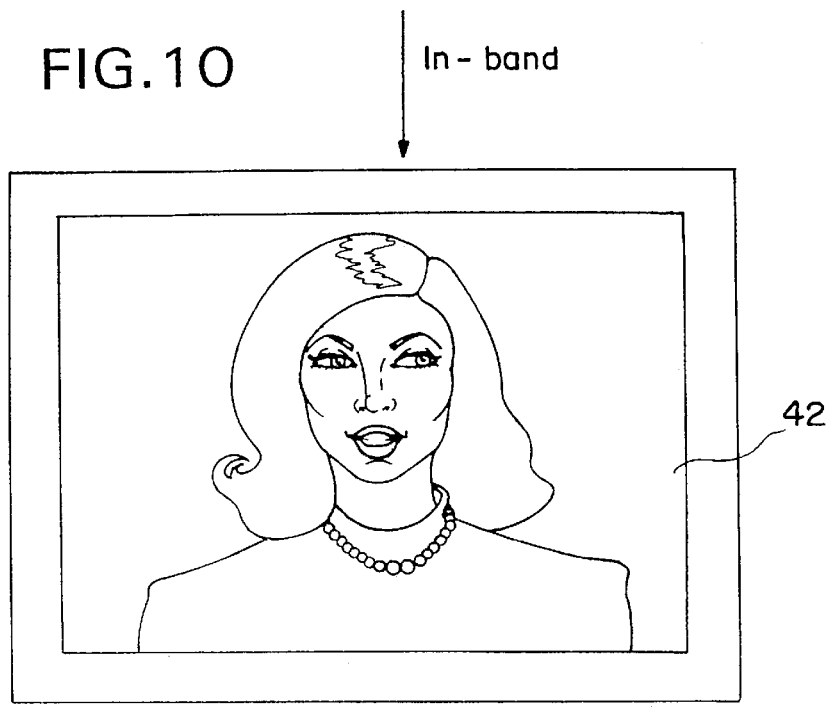
FIG. 10 is graphical in-band program information.
FIG. 11 is the Listen To Music screen menu of the present invention.

Referring to FIG. 10, still pictures or video reconstructed from the in-band song identification stream is viewed by the subscriber when the subscriber tunes to a particular audio broadcast channel 32. Referring to FIG. 11, the "Listen To Music" menu screen is shown. The fixed menu screen permits the subscriber to navigate throughout all functions and operations of the settop terminal 112 as well as to select desired channels via the remote control. Fixed menu pages are generated by the firmware stored in EEPROM. Typical fixed menus are the "Control Channel Listening" page as shown in FIG. 12, "Control Audio Configuration" pages as shown in FIGS. 13 and 14, and "Help" pages as shown on FIGS. 15, 16 and 17.

Menu pages that incorporate out-of-band information received from the CDC 34 are shown in FIGS. 18, 19 and 20. The "Set Favorite Channels", "Set Parental Control" and "Listen To Favorite Channels" pages all incorporate the channel identifiers and descriptions originating from the CDC 34. FIG. 21 shows an archival "Previously Heard" screen. The last five subscriber music selections are stored in memory and can be accessed via the menus. As shown in FIG. 21, an in-band notice 47 is also present.

The audio programming guide 44 of the present invention is shown in FIGS. 22 and 23. Although the audio programming guide 44 integrates both out-of-band 46 information from the CDC 34 and in-band program information 48 from the selected broadcast channels 32, the presentation is transparent to the subscriber, providing an interactive guide to selecting an audio program.

Referring to FIG. 24, the audio programming screen 44 is coupled to the selected in-band audio broadcast channels 32 by displaying current in-band information 48 on a portion of the screen 44. The subscriber is able to "surf" the guide audibly and visually when selecting from among a plurality of available audio channels. For example, referring to FIG. 24, the audio programming screen 44 lists available audio channels A1 through A9. As highlighted, channel A7, "Modern Rock" has been selected. All of the program information regarding the audio channel titles A1–A9 is out-of-band information 46. However, since A7 "Modern Rock" has been selected, the in-band information 48 related to that channel is also shown. Accordingly, the currently playing song entitled "What's the Frequency, Kenneth?" by R.E.M. is displayed on the screen 44 and played to the subscriber. As shown in FIG. 25, the "Now Playing" page displays more information such as R.E.M.'s, "What's the Frequency, Kenneth?" available on the CD release Monster. If channel A3, "Hip Hop" is selected, the in-band information 48 relating to the currently playing song will be displayed on the screen 44 and that song will be played to the subscriber.

In this arrangement, a subscriber may simultaneously view both channel in-band and out-of-band information 46, 48. The in-band song identification (ID) information 48 for the selected channel is continually updated as the subscriber peruses the list of audio channels. Thus, the subscriber is provided with constant feedback regarding the available options. In-band song ID information 48 is typically accumulated in memory and periodically updated and/or overwritten.

The subscriber may also scan through the available channels while listening to the current selection and viewing in-band 46 song ID information pertaining to the highlighted channel. This information is available from the information present on the in-band song ID bit stream.

In an alternative embodiment, in-band information regarding the currently playing selection on each available audio channel is displayed on a preselected channel. This information is continually transmitted to the settop terminal 112 via the broadcast bit stream belonging to the selected channel. In this manner, a subscriber may view a list of available audio channels and simultaneously view the currently playing selection on each channel.

Figure 26:
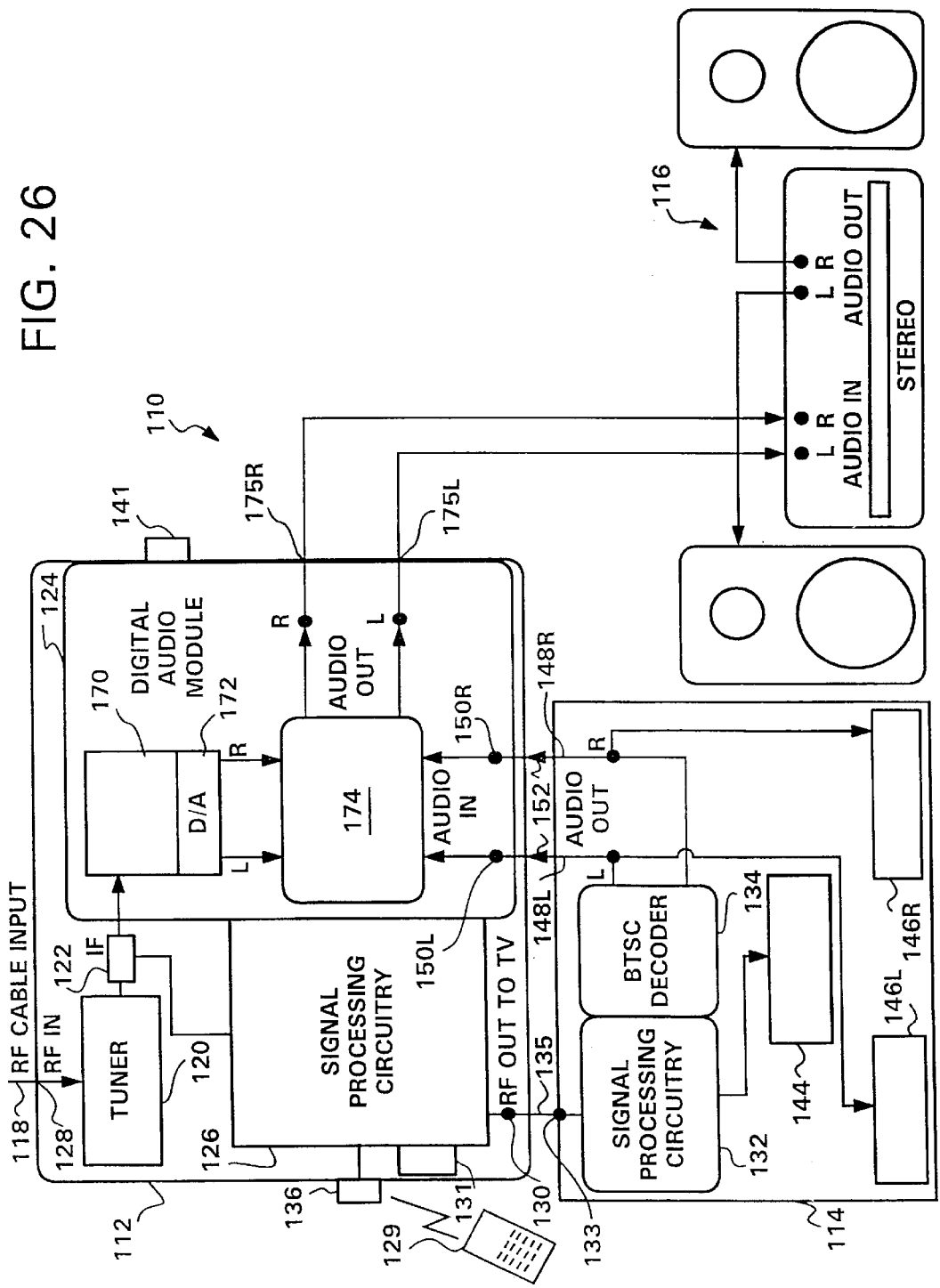
FIG. 26 is a block diagram of the preferred embodiment of settop terminal system of the present invention.

The preferred embodiment of the settop terminal 112 of the present invention is shown in FIG. 26. The tunable, settop terminal 112 simultaneously receives analog video with analog audio and digital audio program signals, as described above, and provides seamless switching between formats. This is achieved by integrating an analog video and audio settop terminal with a digital audio module. Referring to FIG. 26, a typical CATV subscriber installation 110 includes a settop terminal 112, a television monitor receiver 114 and a stereo system 116. The settop terminal 112 is controlled by using either navigation keys 136 located on the front of the unit or an infrared (IR) emitter positioned in front of the settop terminal and controlled by an external device (such as a VCR), or remote control 129. The settop terminal 112 is coupled to the communication network 22 via a coaxial cable drop line 118 brought into a subscriber's home and terminated at a CATV RF input 128.

The settop terminal 112 includes a frequency agile broadband tuner 120, which is selectively tuned to specific CATV channels. The audio and video output from the tuner 120 is forwarded on an intermediate frequency (IF) carrier to an IF buffer 122 and a demodulator. The IF buffer 122 output is input to a digital audio module 124 and signal processing circuitry 126.

Figure 27:
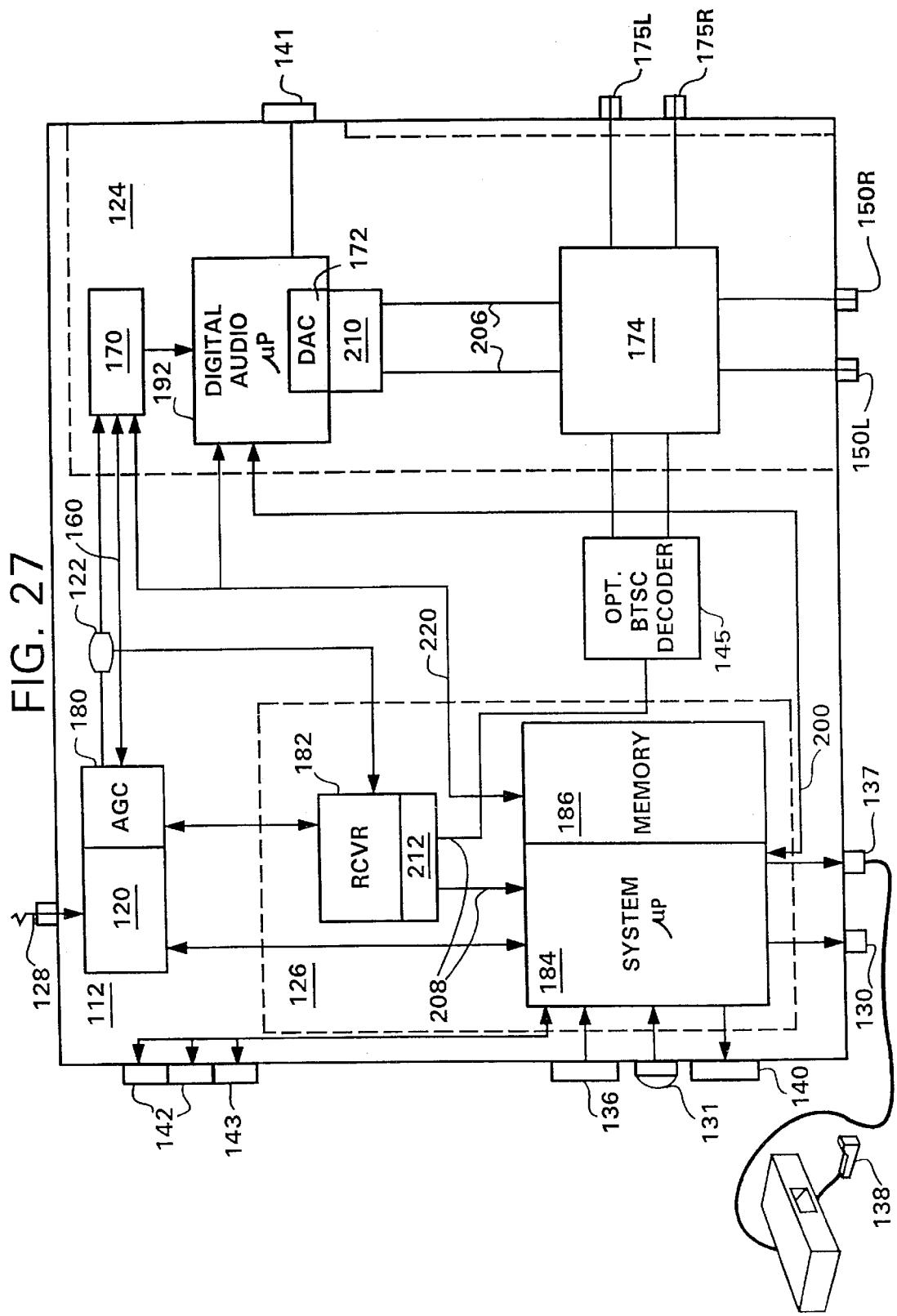
FIG. 27 is a detailed block diagram of the settop terminal with digital audio module.

A serial communication interface to the tuner 120 establishes a link between the tuner 120 and settop terminal processing circuitry 126. The processor 126 oversees all of the functions associated with conventional CATV settop terminals including processing of analog audio-video (A/V) signals, OSD video generation capabilities, signal scrambling detection, signal descrambling, subscriber authorization and subscriber interface via the IR remote controller 129 and receiver 131. Baseband A/V signals are output by the processor 126 to the television monitor receiver 114 via an RF output 130, a coaxial line 135 and an RF input 133. Although the receiver 114 is shown as a television monitor receiver 114, the receiver 114 may comprise a video cassette recorder 115 or any other type of cable-ready device which accepts an RF input signal and provides a BTSC decoded stereo baseband audio output. In the case where an external BTSC decoder is not available, an optional BTSC decoder can be installed within the settop terminal 114. As shown in FIG. 27, the optional BTSC decoder 145 couples the audio output from the analog receiver 182 to an input of a audio selector switch 174.

The baseband A/V signals are separated and processed by the television monitor receiver 114 signal processing circuitry 132. Analog video output is then provided to a monitor 144. Stereo analog audio output, decoded by a BTSC decoder 134, is amplified and reproduced by a pair of speakers 146L, 146R. Accordingly, a subscriber will be able to view a selected analog video program and listen to the associated analog audio program. A detailed discussion of the television signal processing circuitry 132 and the BTSC decoder 134, which are well known to those skilled in the art, is outside the scope of this description.

In the preferred embodiment, the BTSC decoder 134 also outputs a stereo analog audio signal to outputs 148L, 148R, through a shielded cable 152 to audio inputs 150L, 150R of the settop terminal 112.

A narrowband digital receiver 170 within the digital audio module 124 receives the IF signal from the tuner 120 and the digital audio information within the signal is processed to provide a CD-quality audio output. As will be described in detail hereinafter, the digital audio module 124 provides three audio outputs: 1) an attenuable baseband stereo output to the stereo system 116; 2) an attenuable monaural sum of the baseband stereo output for RF modulation and output to the television monitor receiver 114, and 3) an attenuable stereo digital audio output using the industry standard Sony-Philips digital interface format (S/PDIF) 141.

The settop terminal 12 is shown in greater detail in FIG. 27. The tuner 120, coupled to the CATV input 128, tunes to the carrier frequency of the channel selected by the subscriber. The tuner 120 removes the carrier frequency and amplifies the resulting A/V signal. The gain is controlled via an automatic gain control (AGC) 180 so that the output of the tuner 120 remains essentially constant despite variations in CATV signal strength.

The received A/V signal is output from the tuner 120 on an IF carrier to the IF buffer 122, which splits the signal for separate digital and analog processing by the digital audio module 124 and the analog signal processing circuitry 126, respectively.

With respect to analog processing of the A/V signal, the signal is processed in a conventional manner which will be briefly described. The signal is received by an analog receiver 182 which removes the IF carrier. The analog receiver 182 monitors the incoming signal and controls the AGC 180 to ensure that the A/V signal output from the tuner 120 is within allowable limits.

The microprocessor 184, with associated memory 186, detects whether the signals are scrambled, determines whether the subscriber is authorized to receive the requested service and descrambles the received signals. A scramble detection module determines whether the technique used to scramble the A/V signal is a technique supported by the descrambling module. An authorization module determines whether the subscriber is authorized to receive the scrambled services that have been selected. Authorization information, such as a program identifier or service code identifier, is detected on the specific channel being monitored by the microprocessor 184. This information is compared to an authorization code stored within the memory of the processor 126 to determine if the subscriber is an authorized user. Alternatively, the authorization information may be provided on the CDC 34. If a subscriber is authorized, the descrambling module descrambles the A/V signal.

The resulting baseband A/V signal is modulated and output on a second carrier frequency, typically corresponding to VHF channel 3 or 4, for RF input into the television monitor receiver 114. The television signal processing circuitry broadcast channels 32 includes a tuner which is selectively tuned to the RF carrier output from the settop terminal 112.

In the preferred embodiment, channel selection, volume control and other subscriber commands are input to the settop terminal 112 via an IR remote controller 129 and IR receiver 131 or via navigation keys 136. If a new channel is selected, the microprocessor 184, tunes the tuner 120 to the new RF frequency. Confirmation of subscriber commands and service option menus are output to the television monitor receiver 114 for on-screen display. The on-board LED display 140 provides limited indication of mode and channel selection.

With respect to digital processing of the A/V signal, the signal output from the IF buffer 122 is received by a narrowband digital data receiver 170 which removes the IF carrier. The digital receiver 170 monitors the incoming signals to ensure that the A/V signal output from the tuner 120 is within allowable limits. Since the digital data receiver 170 and the analog receiver 182 operate on different frequencies and bandwidths, each receiver 182, 170 has its own circuitry which controls the AGC 180. An AGC switch 158 (not shown) connects either the analog receiver 182 adjustment circuitry or the digital receiver 170 adjustment circuitry to the AGC control input of the tuner 120. Accordingly, the system microprocessor 184 and digital audio microprocessor 192, monitor the incoming RF signal and activate the AGC switch 158 to present the correct adjustment circuitry via line 160 to the AGC 180 based on the type of signal (i.e. analog or digital) being received.

Figure 30:
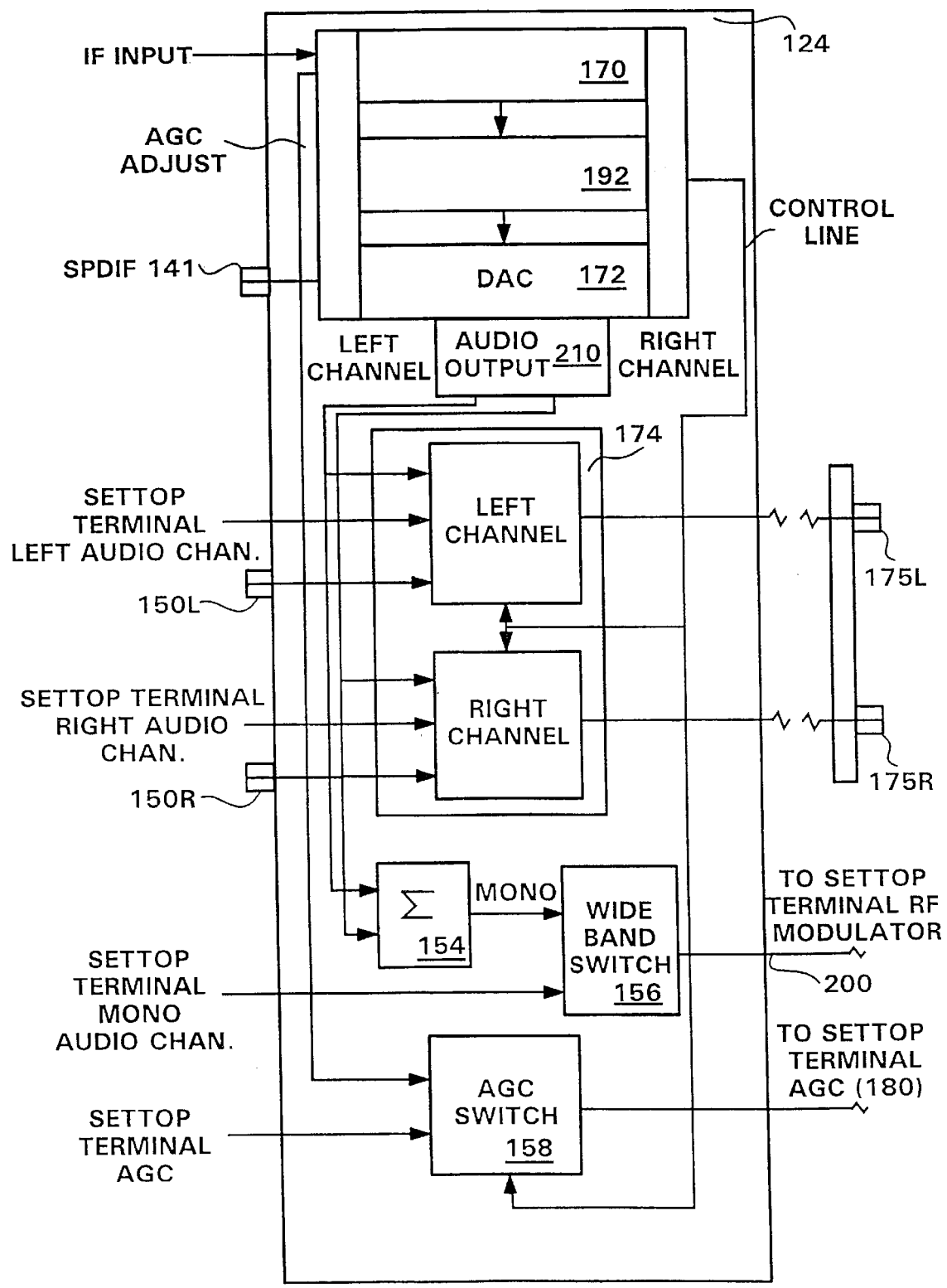
FIG. 30 is a detailed block diagram of the digital audio module.

The digital audio module 124 further comprises a digital-to-analog convertor (DAC) 172 coupled to the digital audio processor 192. As is well known in the art, the digital audio processor 192 demodulates and processes the digital IF signal from the digital receiver 170 to produce a data stream containing digital audio data and additional digital data. As shown in greater detail in FIG. 30, the digital signals are converted by the DAC 172 to analog to provide an input to the audio selector switch 174. A second input to the audio selector switch 174, as discussed above, is provided from the external BTSC decoder 134. A third input to the audio selector switch 174 is from the analog receiver 182. The selector switch 174 normally outputs the audio signal from the external BTSC decoder 134. However, when a channel that contains digital audio is chosen, system microprocessor 184 communicates with digital microprocessor 192 to change the state of selector switch 174. Accordingly, the audio output from the DAC 172 is presented to the output of the audio switch 174.

A direct digital audio output 141 is available for stereo systems that have a compatible S/PDIF input. The digital audio module 124 also provides a monaural sum of the stereo output through summer 154 and output 200. Since the analog receiver 182 provides audio in the form either a monaural signal or a BTSC encoded signal, the monaural signal is switched via the wideband switch 156 with the digital monaural output to the settop terminal 112 signal processing circuitry. 126. If a digital audio program is available, digital audio microprocessor 192 activates the wideband switch 156 to present the digital monaural signal to the signal processing circuitry 126. The monaural audio is output with the video program to the television monitor receiver 114 via the RF input port 133. If the audio outputs 175L, 175R are not connected to the stereo system 116, a digital monaural program may be heard using the television monitor receiver 114.

The settop terminal 112 has also been designed with an automated testing capability utilizing two industry standard RS-232 serial communication ports 142 and one proprietary communication port 143 as connections to the test system. The automated test system interrogates and exercises the terminal through all of the various modes of operation while simultaneously monitoring all inputs and outputs. This reduces the testing time of all the audio and video parameters and insures that all operating specifications are within tolerance.

As described above, the audio output of the settop terminal 112 can be derived from either CATV digital audio or CATV analog audio. In order for operation to appear seamless to the subscriber, switching from one audio source to another must be controlled to ensure that the source levels (i.e., volume) are closely matched, otherwise an abrupt transition could occur. A drastic difference in volume between two sources could startle a subscriber listening to the audio program and potentially overload and damage the stereo system 116. Referring to FIG. 27, software executed in microprocessor 184 ensures that the audio source remains transparent to the subscriber by equalizing the relative source levels of the digital and analog outputs 206, 208. The digital audio source 206 level is held consistent with the video analog audio source 208 level by tracking and adjusting the attenuation of both sources before input to audio amplifiers 210, 212. Any changes to the analog source 208 level will affect the digital source 206 level. As a result, as the subscriber switches between digital audio and video sources 206, 208, the source levels will remain consistent.

Since the digital audio source 206 has a wider dynamic range than the analog audio source 208, the volume level of the digital source 206, may be increased beyond the maximum level of the analog audio source 208. This permits the full digital audio dynamic range to be utilized. The digital audio source 206 level will be maintained until the analog audio mode is re-entered, at which time, the digital audio source 206 level will be reset to the analog audio source 208 level.

The audio output selector feature of the present invention permits transparent selection of the digital audio source 206 or the BTSC decoded stereo audio source 208. This feature supports two intended uses. First, in the case where the subscriber has access to an external BTSC decoder 134, such as in the television monitor receiver 114, the outputs from the BTSC decoder 134 may be routed to the stereo system 116. This permits the subscriber to listen to the stereo system 116 output for any selected video programming. If the video programming includes digital audio, after processing the in-band stereo digital audio source 206 is selected for presentation to the baseband stereo outputs 175L, 175R of the settop terminal 112 as shown in Table 1. If the selected video program does not include a digital audio program, the BTSC decoded stereo audio source 208 is selected. In either case, baseband stereo outputs 175L, 175R are always presented by the settop terminal 112 to the stereo system 116. The second use of the audio selector feature permits a second audio source, such as a CD player, to be input. This is useful when the digital audio module 124 has displaced the CD player in the stereo system 116 or if the optional BTSC decoder is installed and the external audio inputs 150L, 150R are not used. When the settop terminal 112 is not in use, the audio output selector switch 174 defaults to the external input position.

The selection of either the digital audio source 206 or the BTSC decoded source 208 is transparently made by the settop terminal 112 and requires no subscriber intervention.

The RF audio output 130 to the television monitor receiver 114 will source either a monaural sum of the digital audio stereo signals or the standard BTSC encoded audio when digital audio programming is unavailable.

Figure 28A:
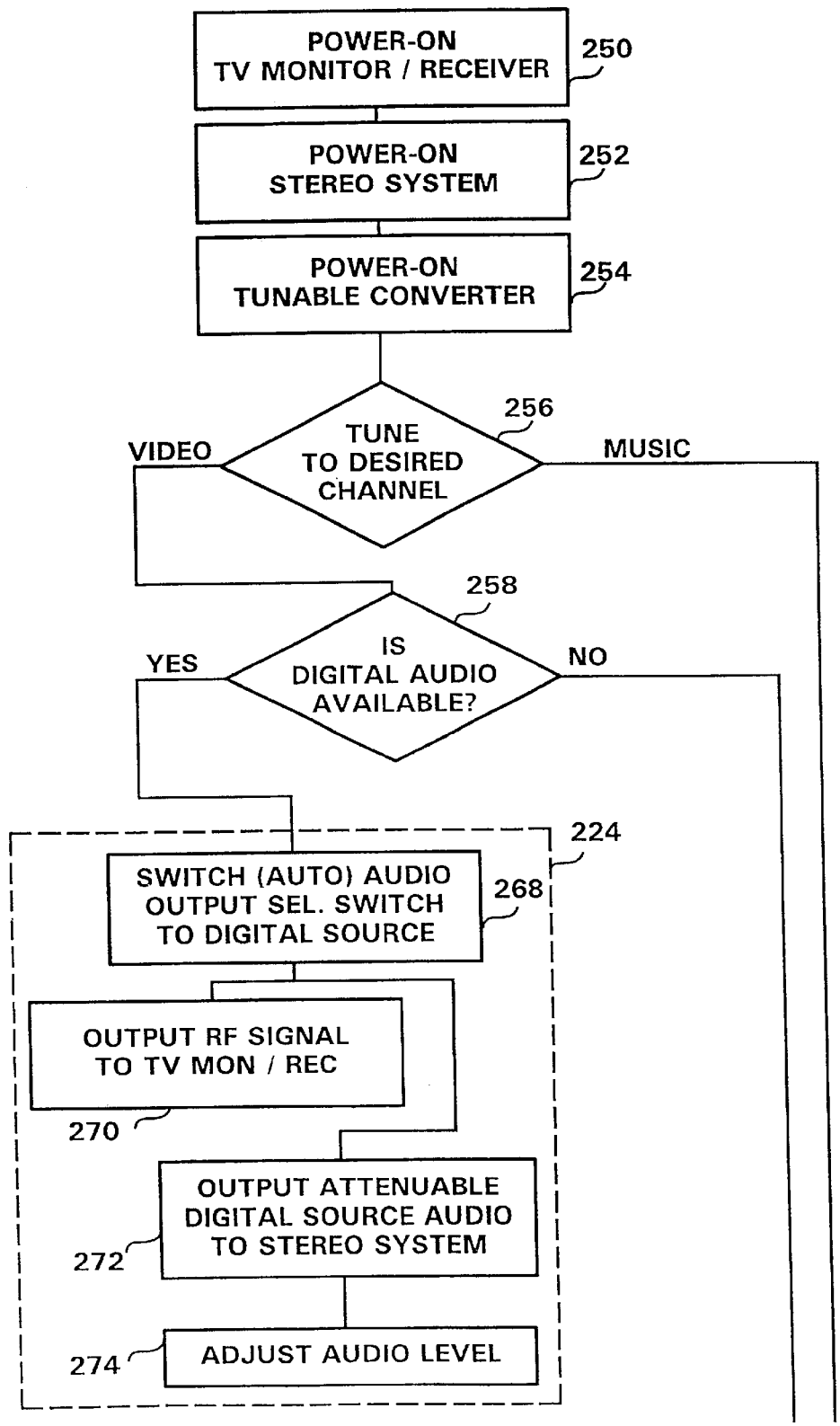
FIG. 28 is a flow chart of the video/digital audio programming selection process.

As shown in FIG. 28, the preferred embodiment of the present invention supports three different modes of operation: 1) standard video mode 220; 2)standard digital audio mode 222; and 3) secure digital audio mode 224. After the television monitor receiver 114, the stereo system 116 and the settop terminal 112 have been turned-on, (steps 250, 252, 254), the subscriber tunes to the desired channel (step 256). For the standard video mode 220, the subscriber selects a video channel wherein no digital audio programming is available (step 258). An A/V RF signal will be output to the television monitor receiver 114 (step 260) and a BTSC decoded audio signal will be reproduced by the television speakers 146L, 146R (step 262). The subscriber may also listen to the audio program via the stereo system 116. In this mode, the audio selector switch 174 within the settop terminal 112 will output the BTSC decoded audio source 108 to the stereo system 116 (step 264). The subscriber then adjusts the audio level at the television monitor receiver 114, the stereo system 116, or via remote control 129 to the desired levels (step 266).

In the secure digital audio mode 224, the subscriber selects a video channel (step 256) wherein an associated digital audio program is available (step 258). The secure digital audio mode 224 replaces the standard analog audio associated with a video channel with digital audio. In addition to providing much greater security, the secure digital audio mode 224 also provides CD-quality sound. In this mode, the audio selector switch 174 will switch to the digital source 206 (step 268) and will output the stereo signals from the digital source 206 to the stereo system 116 (step 272). The settop terminal 112 will output the video and modulated monaural digital audio RF signal to the television monitor receiver 114 for viewing by the subscriber (step 270). The subscriber may then adjust the audio at the television monitors receiver 114, the stereo systems 116, or via remote control 129 to the desired levels (step 274).

In the standard digital audio mode 222, the settop terminal 112 must be tuned to a music channel (step 256). The audio selector switch 174 will switch to the digital source 206 (step 276) and will output the stereo signals from the digital source 206 to the stereo system 216 (step 280). The settop terminal 112 will output the video RF signal to the television monitor receiver 114 for viewing by the subscriber (step 278). The subscriber may then adjust the audio at the stereo 116, or via remote control 129 to the desired level (step 282).

Table 1 summarizes the available modes, hardware, and audio sources which are presented to the TV audio output 130 (RF audio) and baseband (L/R Out) audio output ports 175L, 175R, and how both volume and mute are controlled.

TABLE 1

|  | Standard Video Mode 220 | Standard Digital Audio (MC) Mode 222 | Secure Digital Audio Mode 224 | Simulcast Mode |
|---|---|---|---|---|
| Hardware Required | Standard settop terminal 112 w/Digital Audio Module | Standard settop terminal 112 w/Digital Audio Module | Standard settop terminal 112 w/Digital Audio Module | Standard settop terminal 112 w/Digital Audio Tuner Module |

TABLE 1-continued

|  | Standard Video Mode 220 | Standard Digital Audio (MC) Mode 222 | Secure Digital Audio Mode 224 | Simulcast Mode |
|---|---|---|---|---|
| TV Monitor Audio (RF Modulated Audio) | Standard TV Audio (settop terminal mono or BTSC stereo) | Digital Audio Mono | Digital Audio Mono | Standard TV Audio (settop terminal mono or BTSC stereo) |
| Settop Terminal Baseband Audio Output (L/R) | Standard TV Audio (Settop terminal mono on both L and R or BTSC L/R stereo if equipped with optional BTSC decoder or if inputs are connected to an external BTSC decoder) | Digital Audio Stereo | Digital Audio Stereo | Digital Audio Stereo (simulcast stereo programming in Simulcast Mode; digital audio programming) |
| Settop Terminal Volume Control | Volume up/down controls both TV and baseband audio | Volume up/down controls both TV and baseband audio | Volume up/down controls both TV and baseband audio | Volume up/down controls both TV and baseband audio |
| Settop Terminal Mute Control | Mute function controls both TV and baseband audio | Mute function controls both TV and baseband audio | Mute function controls both TV and baseband audio | Mute function controls both TV and baseband audio |

In an alternative embodiment, shown in FIG. 29, the digital audio module 124 is equipped with its own wideband RF tuner 202. This permits the simultaneous tuning of an analog video channel using video tuner 120 and a digital audio tuner 202. In this case, the digital microprocessor 192 can control either the RF tuner 120 in the settop terminal 112, or its own tuner 202. The currently running application determines which processor becomes master and slave. When a music application is in use, the video microprocessor 184 becomes subservient to the digital audio microprocessor 192.

The wide-band RF tuner 202 may be used to either receive digital audio simulcast channels, such as HBO®, Cinemax®, or Showtime®, during a video broadcast or to receive digital audio programming at the same time that a standard BTSC video program is being received using the main tuner 120. When receiving a video channel that is a simulcast event, the system microprocessor 184 and digital audio microprocessor 192 recognize the broadcast and seamlessly switch the digital audio tuner 202 to the simulcast audio channel adjusting the video and audio level gains as previously discussed. This operation is totally transparent to the subscriber. The audio program that normally accompanies the video program is presented to the television monitor receiver 114 while the digital channel is output to the stereo system 116.

This embodiment also permits the subscriber to mute the normal audio associated with a video channel and, for example, listen to digital audio mode programming while watching a sporting event. When watching video programming and listening to digital audio mode programming concurrently, the RF audio output to the television monitor receiver 14 will carry the audio associated with the video programming. In addition, it also permits one subscriber to view and listen to normal video programming while another subscriber listens to digital audio mode either in another room or using headphones in the same room.

In the alternative embodiment, the subscriber may be required to control two tuners using the same remote or settop terminal controls. The settop terminal 112 provides individual tuner controls (volume, mute, channel up/down) via the remote control 129 or the navigation keys 136 by selecting the applicable tuner prior to making adjustments.

The settop terminal 112 also permits a user to program the settop terminal to automatically tape an audio channel, at a specific time, onto video tape. Accordingly, both an audio program and the associated video song identification information may be recorded onto the video tape. This feature is enabled by the system microprocessor 184 programmable timer function that switches the settop terminal 112 to a pre-arranged channel and initiates a programmed sequence of VCR 115 instructions, such as "power" and "record" for the programmed period of time, then "stop" and "power" (off). The VCR timer program steps are input into the system memory 186 via the on-screen display. This feature is communicated to the VCR 115 via an IR emitter output 137 and optical transmitter 138 that beams the coded transmission to the VCR 115. An IR blaster VCR database, known to those skilled in the art, is contained in the firmware EEPROM.

Figure 31A:
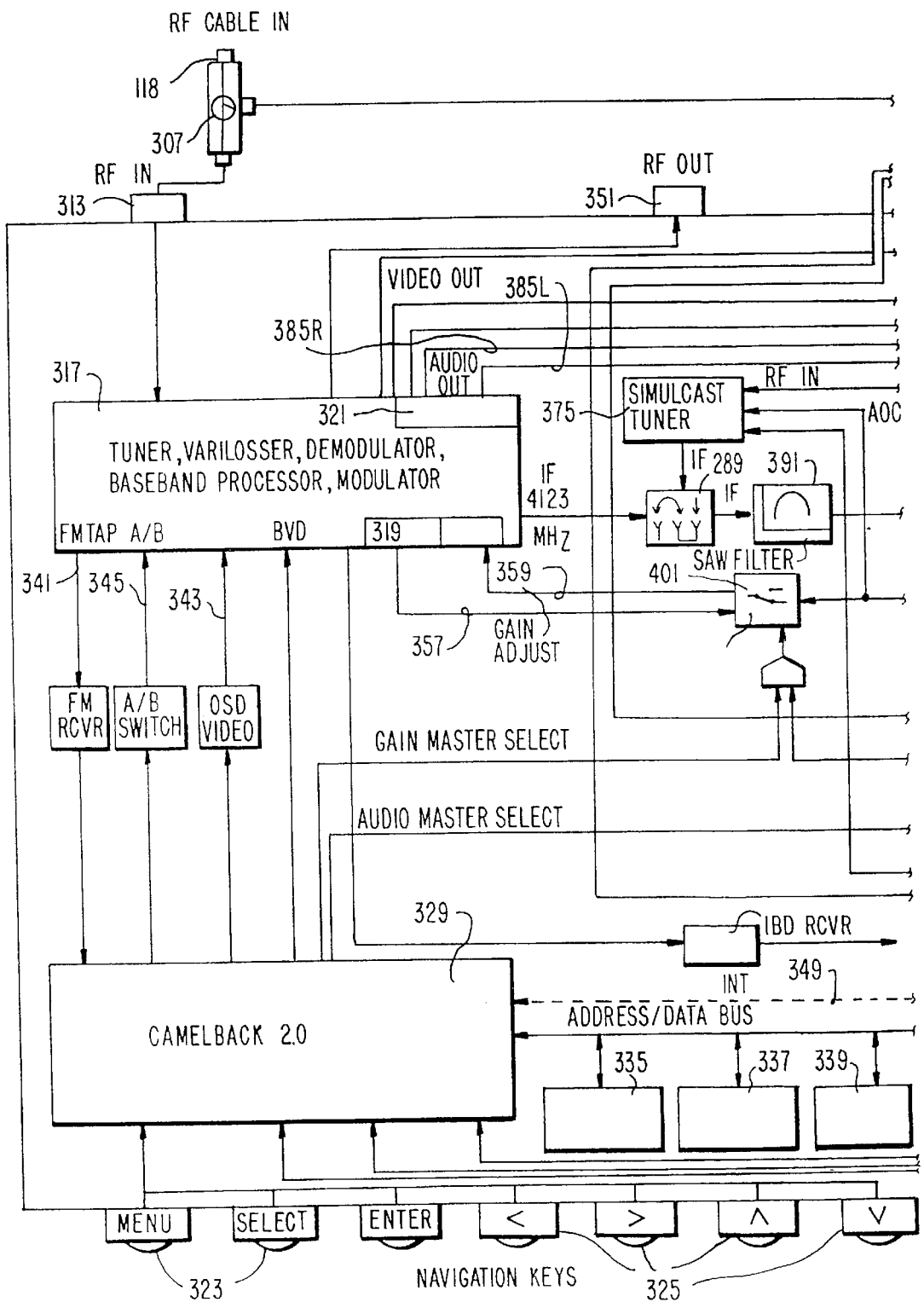
FIG. 31 is a detailed block diagram of another alternative embodiment.
Figure 31B:
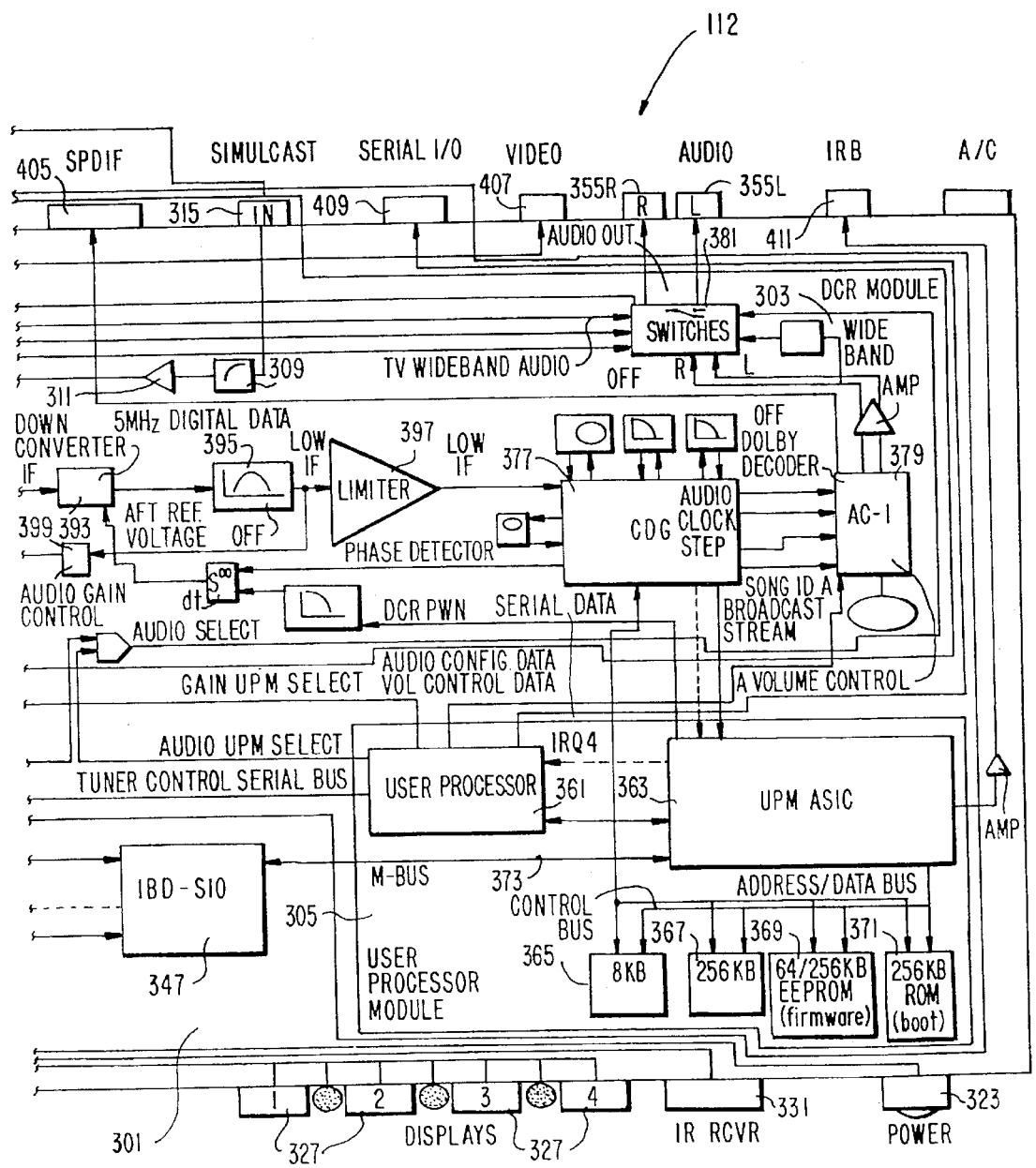

FIG. 31 is a block diagram of another alternative embodiment of the present invention used in combination with a television monitor receiver 114. This embodiment comprises three major components: 1) an upgradeable settop terminal motherboard 301, 2) a plug-in digital cable radio (DCR) module 303, and 3) a plug-in user processor module (UPM) 305.

Referring to FIG. 31, a bi-directional, CATV coaxial cable drop line 118 is brought into a subscriber's home and split by a directional splitter 307. The splitter 307 has one signal input and two outputs. One output is coupled to the RF input 313 of the settop terminal 112. The other output of the directional splitter 307 is coupled to the DCR module 303 simulcast RF input 315.

The settop terminal 112 system tuner 317 receives the CATV transmission from the RF input 313. The system tuner 317 comprises a frequency agile broadband tuner, a varilosser, a demodulator, a baseband signal processor, and an RF frequency modulator. The system tuner 317 also contains the motherboard AGC 319 and BTSC decoder 321.

The subscriber operating interface 323 consists of a power button, a menu button, a select button, an enter button and four screen navigation keys 325. The navigation keys 325 consist of cursor up, down, left and right. User feedback is in the form of four 16 segment LED 327 displays or via an on-screen display. The interface keys 323 and navigation keys 325 are coupled to a Camelback™ 2.0 microprocessor 329. The system microprocessor 329 has 1 kilobyte of static RAM, 32 kilobytes of ROM and 16 kilobytes of switched ROM as coefficient, cache memory. An IR detector 331 is coupled to the system microprocessor 329 for receiving IR coded commands from a remote control 333 having all primary TV, VCR, and settop terminal functions or any other IR emitter transmitting the proper code.

To support the features of the base settop terminal 112 operating system, memory in the form of 32 kilobytes of static RAM (SRAM) 335, 128 kilobytes of font ROM 337 and 256 kilobytes of DRAM 339 is required. The memory units share a common, parallel data bus which transfers data between the settop terminal 112 system microprocessor 329 and microprocessors located on plug-in DCR 303 and UPM 305 modules.

The system microprocessor 329 interprets all commands from either the interface keys 323, the navigation keys 325, the remote commander 333, or an IR emitter and responds accordingly. The system microprocessor 329 also receives settop terminal control and channel mapping information broadcast from the system headend 16 by using the CDC 34 from the tuner FM receiver tap 341. This separate control channel updates the system firmware stored in ROM 337 with new releases whenever user subscriptions change or for security. Additionally, program schedule information is periodically downloaded from the system headend 16 to individual subscribers.

The system microprocessor 329 generates all OSD graphics and text. The OSD video generation is connected on line 343 to the system tuner 317 for RF modulation and summing with the subscriber selected cable channel. The system microprocessor 329 also supports an A/B switching function on line 345 with the system motherboard tuner 317 allowing a subscriber to use the cable ready feature of the TV monitor receiver 114 or VCR if equipped, or use the settop terminal 112 to provide the signal processing.

To provide a virtual channel feature, an in-band decoder (IBD) 347 monitors baseband channels selected by the CDC and removes a variety of information contained within the vertical blanking interval (VBI). Along with the collateral program information, that data may include authorization messages, category information and special services. The IBD 347 demodulates and byte assembles the data into useable words. The data is placed on an intermediate communication bus 349 which transfers the data to the system microprocessor 329.

Upon receipt of a command by the system microprocessor 329, the system tuner 317 tunes to the selected CATV channel, removes the carrier frequency and demodulates the signal. The signal is then output to the television monitor receiver 114 either through an RF F-connector 351 or through a baseband RCA output connector 353. The system tuner 317 also includes a BTSC decoder 321. The stereo signals from the BTSC decoder 321 are output to a subscriber's stereo system 116 through RCA output connectors 355L and 355R or a stereo mini-plug. When the DCR module is installed on the system motherboard, the output of the BTSC decoder 321 is input to the DCR module. The system tuner 317 provides a video AGC output on line 357 and a return feedback to adjust the video AGC on line 359.

The UPM 305 has a dedicated Motorola 68306 microprocessor 361, a custom application specific integrated circuit (ASIC) 363, and coefficient memory supporting the ASIC 363 functions in the form of 8 kilobytes of SRAM 365, 256 kilobytes of DRAM 367, 256 kilobytes of EEPROM 369 and 256 kilobytes of ROM 371. The ASIC 363 communicates with the system tuner 317 through a parallel communication M-bus 373 which transfers data between the ASIC 363 and the IBD 347. The UPM microprocessor 361 uses the 256 kilobytes of ROM 371, and the 256 kilobytes of EEPROM 369 to store applications written in C, C++, assembly language, etc. that have either been previously loaded into the settop terminal 112 or have been downloaded to the settop terminal 112 by the CDC 34. The function of the UPM 305 is to enhance on-screen display graphics generated by the system motherboard microprocessor 329. Additionally, the UPM 305 supports interactive programming guides, third party programming guides, near video on demand (NVOD), VCR control through an external infrared emitter, virtual channels, and an icon-based multicolor navigation system and logos downloaded by the CATV provider. The UPM 305 is required to support the DCR module 303.

The main components of the DCR module 303 are a simulcast tuner 375 which receives digital cablecast programming preselected by a high pass filter 309 from the directional splitter 307 through the simulcast RF input 315, a cable data gobbler (CDG) 377 and an AC-1 Dolby® decoder with volume control 379. The digital data stream is demodulated and disassembled into the discrete components of the digital transmission architecture by the CDG 193. The AC-1 Dolby® decoder and volume control 379 adjusts and decodes the Dolby® encoded digital stereo signals prior to outputting the stereo signals to a subscriber's stereo system 116. An audio bypass switch 381 allows either the BTSC audio outputs from the system motherboard tuner 317 on lines 383L and 383R or the DCR module 303 audio outputs on lines 385L and 385R to be chosen in a fashion predetermined by the CDC, system microprocessor 329 and UPM microprocessor 361 depending upon what programming the subscriber is watching.

The simulcast CATV channels enter the DCR module 303 through an external F-connector 315 coupled to the high pass filter 309. The RF signal is boosted by a preamplifier 311 to account for the passive filter 309 attenuation. The DCR simulcast tuner 375 tunes to a preselected channel determined by the UPM microprocessor 361.

The UPM microprocessor 361 and ASIC 363 communicate with the system motherboard microprocessor 329 on the M-bus 373. The motherboard tuner 317 can receive all cablecast channels whereas the simulcast tuner receives only channels having digital information. The control data downloaded by the CDC instructs the motherboard microprocessor 361 which channels are video with analog audio, video with digital audio replacing the analog audio, video with a simulcast broadcast and digital radio. When a DCR module 303 having a simulcast tuner 375 is installed, a jumper normally coupling the IF output of the system motherboard tuner 317 to a 41.25 MHz passband surface acoustic wave (SAW) filter 391 is removed allowing the output of the simulcast tuner 375 to pass to the SAW filter 391. If a DCR module not having a simulcast tuner 375 is installed, the jumper 389 remains in place.

The output of the DCR simulcast tuner 375 passes to the SAW filter 391. The filter 391 attenuates adjacent channel artifacts from the modulated digital data transmission. The IF is then input to a down converter 393 which converts the signal to a lower frequency. The output of the down converter 393 is filtered by a band pass filter 395 and fed into an amplifier/limiter 397 which removes any extraneous video amplitude modulation and an AGC circuit 399. The output from the circuit 399 is fed to the DCR simulcast tuner 375 and one input of an AGC two-position switch 401. The other input to the AGC switch 401 is from the system motherboard tuner 317 AGC output 319. The output of the AGC switch 401 is passed to the gain adjust input of the system motherboard tuner 317.

The gain of the system motherboard tuner 317 is controlled from its own AGC 319 unless the subscriber switches to a DCR channel or if the in-band audio program is digital. The purpose of the AGC switch 401 is to insure that a uniform audio level is maintained while switching between the system tuner 317 or the simulcast tuner 375. The AGC is a closed feedback loop used to prevent overload in the IF stages from a strong input signal. The system microprocessor 329 or the UPM microprocessor 361 control of the AGC switch. Both microprocessors have an AGC select control line which are input into a control gate which selects the AGC switch 401 input.

The output from buffer amplifier 397 is input into the CDG 377. The CDG 377 demodulates the DCR channel into a serial bit stream. The serial bit stream is then output from the CDG 377 to the UPM ASIC 363 where the bit stream is then byte assembled into the various components of the aforesaid unit formats. Thereafter, the control data is passed onto the UPM microprocessor 361, whereas the recovered audio data is returned back to the CDG 377. The CDG 377 recovers the data pertaining to the song identification and broadcast data bit streams and byte assembles the information into usable words. The complete song identification and broadcast words are output to the UPM microprocessor 361 for combination with the OSD for output to the television monitor receiver 114. The OSD adds the applicable information depending on whether song or broadcast information is requested.

The audio-only bit stream is fed to an AC-1 Dolby® decoder 379 for further signal processing. A digital volume control and 1-bit Delta-Sigma digital-to-analog converter within the AC-1 379 performs the digital-to-analog conversion of the stereo program. The AC-1 405 also provides a S/PDIF digital output for use with the subscriber's stereo.

The analog stereo signals are output to the audio bypass switch 381 and a summing amplifier producing a monaural signal. The monaural program is modulated with the video RF output 407 to be reproduced by the television monitor receiver 114. If the subscriber does not have a stereo 116 connected to the settop terminal 112, the monaural program will be reproduced.

The audio bypass switch 381 also functions in a two-position configuration switching between the BTSC decoder 321 outputs from the system motherboard tuner 317 or the digital outputs from the AC-1 379. In a fashion similar to the AGC select, the decision to output from either source is performed by the system microprocessor 329 and UPM microprocessor 361. The decision is based upon whether the audio program received is from a digital source.

The UPM 305 also provides a serial I/O capability using an IEEE RS-232 output 409. A computer accessory using a compatible connector and protocol can accept information downloaded by the cable provider headend 16 addressed to a specific subscriber and either output or store the data onboard the UPM 305. The UPM 305 also supports remote control of a subscriber's VCR (not shown) through an infrared emitter output 411. The UPM ASIC 363 generates the settop 112 timer programming/channel selection guide in conjunction with the OSD channel map and provides one touch VCR programming 369. The settop terminal 112 activates the VCR in accordance with the timer program and switches to the desired channel. An infrared emitter positioned in front of a subscriber's VCR activates the VCR by using the VCR manufacturer's IR code sequence from a selection of pre-programmed codes stored in the UPM 305 firmware 369.

In an alternative embodiment, the bits comprising the digital audio data stream as shown in FIG. 6 are replaced with digital data. The digital data may comprise information such as music artist bibliographies, video or information supplanting the is broadcast bit stream. The information may also comprise downloadable information or software for use on personal computers. To allow a high speed direct communication from the cable data gobbler to the UPM ASIC, a DMA (direct memory access) interface is used to transfer the bytes of data. A typical DMA is well known to those skilled in the art and will not be described herein. Accordingly, additional DRAM is required to keep the data moving. The digital data is then accessed depending upon the purpose or the subscriber's use.

The display and presentation of the song information is configurable. Referring to FIG. 25, the song identification (ID) information of the present invention consists of five fields—Song ID consists of 5 fields: 1) song title; 2) artist; 3) CD title; 4) record label; and 5) notice. A song ID display consists of 16 lines, the top line is the song ID temporal reference (current vs. previous), the next two lines are channel specific, the next 11 lines are used for formatting song ID information on a screen, with the remaining two lines being fixed text (help information).

There are three methods for formatting song ID information on screen: 1) maximize readability on a page; 2) maximize information displayed on a page; and 3) allow multiple pages of information.

Figure 32:
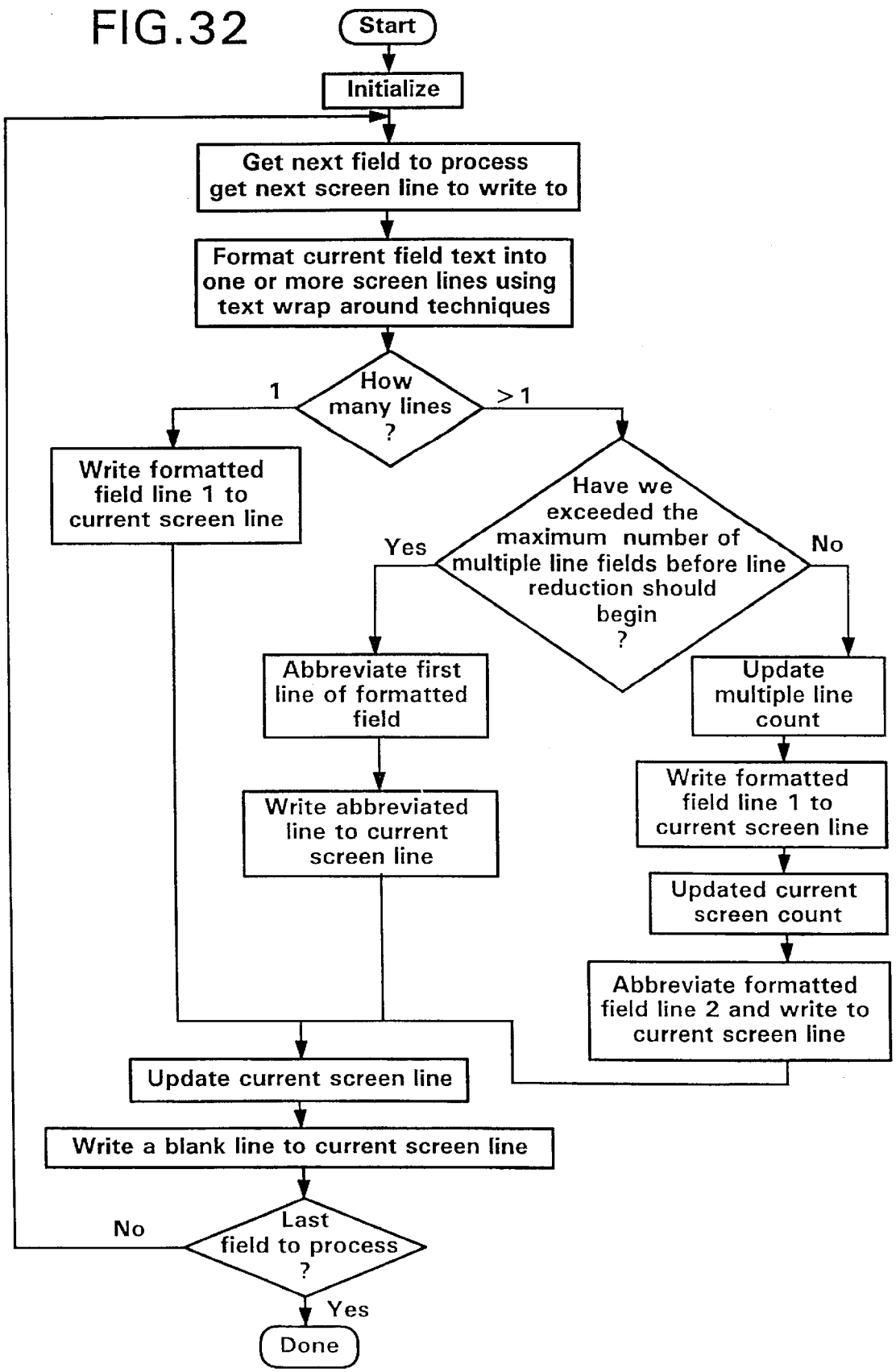
FIG. 32 is a flow chart of the maximum readability display method.

Referring to FIG. 32, readability is maximized by inserting a blank line between each field displayed, at the expense of abbreviating the data. In order to allow 1 blank line between fields, up to 2 fields may use 2 lines (all other fields will be abbreviated to 1 line). Fields are assigned priority such that higher priority fields will have first chance at using 2 lines.

Figure 33:
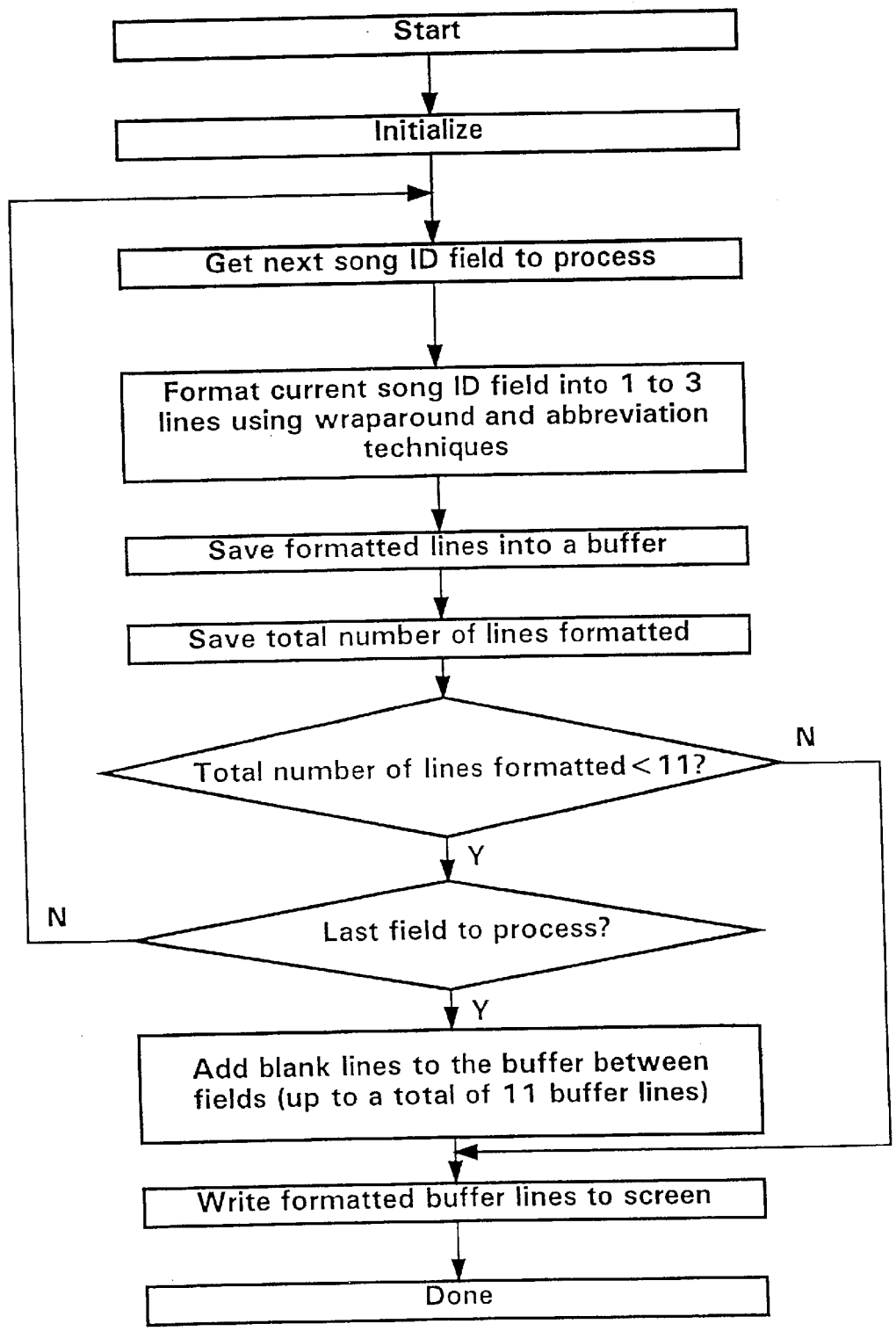
FIG. 33 is a flow chart of the maximum information display method.

Referring to FIG. 33, data content is maximized by eliminating blank lines between fields, unless there are extra lines left over. Preprocessing is required to decide whether or not blank lines will be available after the data formatting is completed. Data is limited to 3 lines (no data should exceed this limit); since only 11 lines are available, it is possible for some fields to be forced to be abbreviated or deleted. Fields are assigned priority such that higher priority fields will have first chance at using 3 lines. As a result, lower priority fields may be forced to be abbreviated. The lowest priority field may be forced to be deleted altogether.

The third song ID formatting option is to allow multiple screens. Multiple song ID screens allow each field to take up as many lines as required. If the screen becomes full, a user is permitted to access subsequent pages of information.

With respect to text manipulation, word wrap and abbreviation techniques are utilized. For the word wrap technique, words are placed on a line until no more complete words can fit. The end of a word is defined as any one the following wrap characters: 1) space; 2) ,; 3) /; 4) .; 5) -; 6) \; 7) &; 8) ;; and 9) :. Other wrap characters can be added to the word wrap technique. For the abbreviation technique, if a complete line of text does not fit on the last available screen line, the text line is truncated at the 29th character and 3 ellipses ( . . . ) are added to indicate abbreviation.

By utilizing the methods discussed above, the song ID information may be formatted as desired to maximize content (displays as much information as possible, while still keeping it readable) or maximize readability (displays the information in a very readable format, which may involve abbreviating the content).

The design of the song information protocol is such that the song ID information can be displayed by any number of settop terminals 112 (analog or digital, integrated or standalone) that may use completely different methods for displaying the information to the subscriber. The protocol uses a series of escape sequences to identify information sections and to identify formatting information as well. The settop terminal 112 (or display device) can elect to use this information in order to display song information.

The protocol supports devices which fall into two broad categories: 1) devices which require that formatting information be included with the data, but which generally do not need to identify the purpose of any given piece of information; 2) devices which do not require formatting information but which need to identify each piece of information to allow the device to determine appropriate display formatting. To accomplish this support, the protocol subdivides each song information field (song title, song artist, CD name, recording label, channel name, notices) into three logical sections: 1) a field formatting prefix; 2) a field data body; 3) a field identification suffix.

The field prefix specifies device-dependent display setup, such as clear display, cursor positioning and display data type. The field data body contains the actual information which must be displayed. The field suffix identifies the field by canonical type. A device which requires display formatting simply ignores any suffix. A device which requires field identification ignores the field prefix. Some devices may be able to use a combination of both types of information. To accommodate a mix of devices in a single CATV system, the protocol requires that the escape sequences used throughout the protocol are all unique, and that all devices simply ignore any escape data which is not relevant to their own operation.

Although the invention has been described in part by making detailed reference to certain specific embodiments, such details are intended to be instructive rather than restrictive. It will are appreciated by those skilled in the art that many variations may be made in the structure and mode of operation without departing from the spirit and scope of the invention as disclosed in the teachings herein.

We claim:

1. A method of formatting data to maximize the readability of song identification (ID) information displayed in a plurality of data fields on a monitor screen used to view in-band audio broadcast channel song ID information and out-of-band audio broadcast channel song ID information, the in-band ID information being associated with a song that is currently being played on a selected one of a plurality of channels, and the out-of-band ID information being associated with all of the plurality of channels, the method comprising:

(a) determining a maximum number of individual lines of the in-band ID information for one of the data fields on the monitor screen;

(b) formatting the one data field based on acquired data field data and the maximum number of individual lines of the in-band ID information, wherein at least one of the individual lines of the in-band ID information is abbreviated if the amount of data field data exceeds the maximum number of individual lines of the in-band ID information;

(c) writing a blank line after the individual lines of the in-band audio broadcast channel song ID information; and (d) repeating steps (a)–(c) for at least another one of the data fields on the monitor screen, wherein the in-band ID information and the out-of-band information are simultaneously displayed on the monitor screen.

2. The method of claim 1 further comprising:

(e) assigning a priority to each of the plurality of data fields, whereby the data fields having a high priority are allotted more individual lines for the in-band ID information than the data fields having a lower priority.

3. The method of claim 1 wherein each formatted data field is limited to two individual lines for the in-band ID information.

4. The method of claim 1 wherein the method is implemented in a cable television settop terminal.

5. The method of claim 1 wherein the in-band ID information includes at least one song title.

6. The method of claim 1 wherein the in-band ID information includes the name at least song artist.

7. The method of claim 1 wherein the in-band ID information includes the name of at least one record company.

8. The method of claim 1 wherein the in-band ID information includes the name of at least one broadcast channel.

9. The method of claim 1 wherein the in-band ID information is sent at a rate of 1,330 bits per second.

10. A method of formatting data to maximize the amount of song identification (ID) information displayed in a plurality of data fields on a monitor screen used to view in-band audio broadcast channel song ID information and out-of-band audio broadcast channel song ID information, the in-band ID information being associated with a song that is currently being played on a selected one of a plurality of channels, and the out-of-band ID information being associated with all of the plurality of channels, the method comprising:

(a) formatting one of the data fields on the monitor screen by performing wraparound and abbreviation techniques to limit the number of individual lines used to display the in-band ID information for the one data field;

(b) storing the one data field in a buffer;

(c) if the total number of individual lines used to display the in-band ID information is less than a predetermined maximum number of individual lines, repeating steps (a) and (b) for another one of the data fields on the monitor screen; and (d) if the total number of individual lines used to display the in-band ID information is not less than the predetermined maximum number of individual lines, displaying the formatted data fields on the monitor screen, wherein the in-band ID information and the out-of-band information are simultaneously displayed on the monitor screen.

11. The method of claim 10 further comprising:

(e) assigning a priority to each of the plurality of data fields, whereby the data fields having a high priority are allotted more individual lines for the in-band ID information than the data fields having a lower priority.

12. The method of claim 11 wherein one or more of the data fields having a low priority may be deleted if the total number of individual lines used to display the in-band ID information is not less than the predetermined maximum number of individual lines.

13. The method of claim 11 wherein the data fields having a high priority are limited to three individual lines of in-band ID information.

14. The method of claim 13 further comprising:

(e) storing and displaying a graphical image associated with a particular song.

15. The method of claim 10 wherein the method is implemented in a cable television settop terminal.

16. The method of claim 10 wherein the in-band ID information includes at least one song title.

17. The method of claim 10 wherein the in-band ID information includes the name of at least one song artist.

18. The method of claim 10 wherein the in-band ID information includes the name of at least one record company.

19. The method of claim 10 wherein the in-band ID information includes the name of at least one broadcast channel.

20. The method of claim 10 wherein the in-band ID information is sent at a rate of 1,330 bits per second.

21. The method of claim 14 further comprising:

(e) storing and displaying a graphical image associated with a particular song.

* * * * *

UNITED STATES PATENT AND TRADEMARK OFFICE
CERTIFICATE OF CORRECTION

PATENT NO. : 6,807,676 B1
DATED : October 19, 2004
INVENTOR(S) : Robbins et al.

It is certified that error appears in the above-identified patent and that said Letters Patent is hereby corrected as shown below:

Column 19,
Line 9, after the word "name", delete "at least" and insert therefor -- of at least one --.

Signed and Sealed this

First Day of March, 2005

JON W. DUDAS
*Director of the United States Patent and Trademark Office*